US012731417B2

(12) United States Patent
Shin et al.

(10) Patent No.: US 12,731,417 B2
(45) Date of Patent: Sep. 8, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Dongeui Shin, Suwon-si (KR); Minhee Lee, Suwon-si (KR); Sanghyun Kang, Suwon-si (KR); Hyunsuk Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 18/118,445

(22) Filed: Mar. 7, 2023

(65) Prior Publication Data

US 2023/0222818 A1 Jul. 13, 2023

Related U.S. Application Data

(63) Continuation of application No. PCT/KR2021/014242, filed on Oct. 14, 2021.

(30) Foreign Application Priority Data

Nov. 16, 2020 (KR) ........................ 10-2020-0152728

(51) Int. Cl.
*G06V 20/64* (2022.01)
*G05D 1/00* (2006.01)
(Continued)

(52) U.S. Cl.
CPC ........... *G06V 20/64* (2022.01); *G05D 1/0238* (2013.01); *G05D 1/0246* (2013.01); *G06T 3/4038* (2013.01); *G06V 10/25* (2022.01)

(58) Field of Classification Search
CPC ........ G06V 20/64; G06V 10/25; G06V 10/10; G05D 1/0238; G05D 1/0246;
(Continued)

(56) References Cited

U.S. PATENT DOCUMENTS 9,258,453 B2 2/2016 Kato et al.
9,602,720 B2 3/2017 Okuda et al.
(Continued)

FOREIGN PATENT DOCUMENTS

CN 108932275 A 12/2018
JP 2002-34055 A 1/2002
(Continued)

OTHER PUBLICATIONS

Khan, S.M. and Shah, M., 2008. Tracking multiple occluding people by localizing on multiple scene planes. IEEE transactions on pattern analysis and machine intelligence, 31(3), pp. 505-519.*
(Continued)

*Primary Examiner* — Zhitong Chen
(74) *Attorney, Agent, or Firm* — Sughrue Mion, PLLC

(57) ABSTRACT

An electronic apparatus is disclosed. The electronic apparatus comprises: a first camera having a first image capturing angle; a second camera having a second image capturing angle larger than the first image capturing angle; and a processor which when a portion of a target object is identified and an obstacle object overlapping the other portion of the target object is identified from at least one of a first captured image acquired from the first camera and a second captured image acquired from the second camera, acquires location information of the identified obstacle object, identifies a region of interest in the second captured image on the basis of the acquired location information of the obstacle object, and identifies the other portion of the target object on the basis of the region of interest in the second captured image.

13 Claims, 23 Drawing Sheets

(51) Int. Cl.
*G06T 3/4038* (2024.01)
*G06V 10/25* (2022.01)

(58) Field of Classification Search
CPC ......... G06T 3/4038; G06T 2207/20132; G06T 2207/20221; G06T 2207/30252; G06T 5/50; G06T 5/77; G06T 7/11; G06T 7/70; H04N 7/185; H04N 7/181; G06F 18/22
See application file for complete search history.

(56) References Cited

U.S. PATENT DOCUMENTS

| | | | |
|---|---|---|---|
| 9,781,340 B2 | 10/2017 | Shinozaki et al. | |
| 11,087,181 B2 | 8/2021 | Greene | |
| 11,237,388 B2 | 2/2022 | Oba et al. | |
| 2006/0192660 A1 | 8/2006 | Watanabe et al. | |
| 2014/0288413 A1 | 9/2014 | Hwang et al. | |
| 2018/0020145 A1 | 1/2018 | Kotfis et al. | |
| 2018/0210452 A1 | 7/2018 | Shin et al. | |
| 2019/0068943 A1 | 2/2019 | Nguyen | |
| 2019/0179140 A1 | 6/2019 | Oba et al. | |
| 2019/0259139 A1 | 8/2019 | Ichihashi et al. | |
| 2020/0195826 A1 | 6/2020 | Seiffert et al. | |
| 2024/0265707 A1* | 8/2024 | Peppoloni | G06T 7/285 |

FOREIGN PATENT DOCUMENTS

| | | | |
|---|---|---|---|
| JP | 3913186 B2 | 5/2007 | |
| JP | 2012-235198 A | 11/2012 | |
| JP | 5610867 B2 | 10/2014 | |
| KR | 10-2012-0060339 A | 6/2012 | |
| KR | 10-2018-0059099 A | 6/2018 | |
| KR | 10-2018-0080936 A | 7/2018 | |
| KR | 10-2019-0030953 A | 3/2019 | |
| KR | 10-2019-0067578 A | 6/2019 | |
| WO | 2017/091008 A1 | 6/2017 | |
| WO | 2018/037790 A1 | 3/2018 | |
| WO | 2019/098567 A1 | 5/2019 | |
| WO | WO-2020024684 A1 * | 2/2020 | H04N 13/275 |

OTHER PUBLICATIONS

Jabborov, F. and Cho, J., 2020. Image-based camera localization algorithm for smartphone cameras based on reference objects. Wireless Personal Communications, 114(3), pp. 2511-2527.*

Communication dated Feb. 3, 2022, issued by the International Searching Authority in counterpart International Application No. PCT/KR2021/014242 (PCT/ISA/210).

Communication dated Feb. 3, 2022, issued by the International Searching Authority in counterpart International Application No. PCT/KR2021/014242 (PCT/ISA/237).

Zhao Pei et al., "Occluded-Object 3D Reconstruction Using Camera Array Synthetic Aperture Imaging," Sensors, 2019, 19, 607; doi:10.3390/s19030607, XP 093107926, Total 22 pages.

Communication issued on Dec. 12, 2023 by European Patent Office in corresponding European Application No. 21892165.8.

Communication dated Mar. 31, 2025, issued by the European Patent Office in counterpart European Application No. 21892165.8.

Communication dated Nov. 29, 2025, issued by the Korean Ministry of Intellectual Property in Korean Application No. 10-2020-0152728.

Communication dated Nov. 30, 2025, issued by the Chinese National Intellectual Property Administration in Chinese Application No. 202180069624.7.

Office Action issued on May 16, 2026 by the Chinese Patent Office in corresponding CN Patent Application No. 202180069624.7.

* cited by examiner

FIG. 9

ELECTRONIC APPARATUS AND CONTROLLING METHOD THEREOF

CROSS-REFERENCE TO RELATED APPLICATIONS

This application is a by-pass continuation of International Application No. PCT/KR2021/014242, filed on Oct. 14, 2021, which is based on and claims priority to Korean Patent Application No. 10-2020-0152728, filed on Nov. 16, 2020, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus that identifies a target object covered by an obstacle, and a controlling method thereof.

2. Description of the Related Art

For automating a task of identifying the inventory for various products, a mobile robot can be used. Here, by including a camera in the mobile robot, the location and the quantity, etc., of products can be identified. Meanwhile, all products may not be arranged such that they can be recognized easily through the camera. For example, in case one product and another product are overlapped, or one product and an obstacle are overlapped with each other, there may be a difficulty for the mobile robot in identifying the inventory.

Also, a mobile robot may include a flash. In capturing a product, the image may need to be acquired in a brighter state because the lighting in the indoor space is dark, or for recognizing the text. Here, the product itself or the label, etc. may be of a material on which light can be easily reflected. Here, in case a lot of light is reflected by the flash, etc., there may be a problem that the image captured by the mobile robot may have a rather deteriorated recognition rate.

SUMMARY

Provided is an electronic apparatus that identifies a target covered by an obstacle by using images acquired from a plurality of cameras having different image capturing angles from one another, and a controlling method thereof.

According to an aspect of the disclosure, an electronic apparatus includes: a first camera having a first image capturing angle; a second camera having a second image capturing angle greater than the first image capturing angle; and at least one processor configured to: acquire a first captured image through the first camera, acquire a second captured image through the second camera, and based on identification of a first portion of a target object in either the first captured image or the second captured image and identification of an obstacle object overlapping a second portion of the target object in either the first captured image or the second captured image: acquire location information of the identified obstacle object, identify a region of interest of the second captured image based on the acquired location information of the identified obstacle object, and identify the second portion of the target object based on the region of interest of the second captured image.

The at least one processor of the electronic apparatus may be further configured to: acquire a combined image comprising an entire image of the target object based on a region of the first captured image which includes the target object and the obstacle object and the region of interest of the second captured image, and identify the target object based on the acquired combined image.

The first captured image may include an image captured by the first camera in a first image capturing location, and the second captured image may include an image captured by the second camera in a second image capturing location different from the first image capturing location.

The at least one processor of the electronic apparatus may be further configured to: acquire a third captured image through the second camera in a third image capturing location different from the first image capturing location and the second image capturing location, identify a region of interest of the third captured image based on the acquired location information of the identified obstacle object, and identify the second portion of the target object based on the region of interest of the second captured image and the region of interest of the third captured image.

The second image capturing location may be located in a first direction relative to the first image capturing location, and the third image capturing location may be located in a second direction different from the first direction relative to the first image capturing location.

The at least one processor of the electronic apparatus may be further configured to: identify a region of interest of the second captured image based on direction information corresponding to the second image capturing location and location information of the obstacle object, and identify a region of interest of the third captured image based on direction information corresponding to the third image capturing location and the location information of the obstacle object.

The at least one processor of the electronic apparatus may be further configured to: acquire first information of the target object based on the first portion of the target object, and acquire second information of the target object based on the second portion of the target object.

The at least one processor of the electronic apparatus may be further configured to: wherein the at least one processor is further configured to: identify location information and size information of the obstacle object based on the first captured image, and identify an image capturing location of the second camera based on the identified location information and size information of the obstacle object, and the second captured image may be an image captured in the identified image capturing location.

The electronic apparatus may further include: a light emitter, and the at least one processor of the electronic apparatus may be further configured to: identify a region of interest of the first captured image, identify a location corresponding to an area adjacent to the region of interest of the first captured image and the region of interest of the second captured image, and control the light emitter to irradiate a light greater than or equal to a threshold strength on the identified location.

The at least one processor of the electronic apparatus may be further configured to change a light emitting angle of the light emitter to cause light to be irradiated on the identified location.

According to an aspect of the disclosure, a method of controlling an electronic apparatus includes: acquiring a first captured image through a first camera having a first image capturing angle; acquiring a second captured image through a second camera having a second image capturing angle greater than the first capturing angle; and based on identifying a first portion of a target object in either the first captured image or the second captured image and identifying an obstacle object overlapping a second portion of the target object in either the first captured image or the second captured image: acquiring location information of the identified obstacle object, identifying a region of interest of the second captured image based on the acquired location information of the identified obstacle object, and identifying the second portion of the target object based on the region of interest of the second captured image.

The method may further include: acquiring a combined image comprising an entire image of the target object based on a region of the first captured image which includes the target object and the obstacle object and the region of interest of the second captured image; and identifying the target object based on the acquired combined image.

The first captured image may include an image captured by the first camera in a first image capturing location, and the second captured image may include an image captured by the second camera in a second image capturing location different from the first image capturing location.

The method may further include: acquiring a third captured image captured through the second camera in a third image capturing location different from the first image capturing location and the second image capturing location; identifying a region of interest of the third captured image based on the acquired location information of the identified obstacle object; and identifying the second portion of the target object based on the region of interest of the second captured image and the region of interest of the third captured image.

The second image capturing location may be located in a first direction relative to the first image capturing location, and the third image capturing location may be located in a second direction different from the first direction relative to the first image capturing location.

According to an aspect of the disclosure, an electronic apparatus includes: a first camera module comprising a first camera and a second camera; a second camera module comprising a third camera and a fourth camera; a third camera module comprising a fifth camera and a sixth camera; and at least one processor, wherein the first camera module, the second camera module and the third camera module are disposed along a vertical axis of the electronic apparatus, the first camera, the third camera and the fifth camera have a first image capturing angle, the second camera, the fourth camera and the sixth camera have a second image capturing angle greater than the first image capturing angle, and the at least one processor is configured to: acquire a first image from the first camera, a second image from the second camera, a third image from the third camera, a fourth image from the fourth camera, a fifth image from the fifth camera, and a sixth image from the sixth camera, identify, from the first image or the second image, an image including a first portion of a target object and an obstacle object, wherein the obstacle object obscures a second portion of the target object in the first image and the second image, and based on identification of a viewable portion of the second portion of the target object in the third image, the fourth image, the fifth image or the sixth image, generate a combined image based on one or more of the first image, the third image, and the fifth image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram illustrating an image captured in a third image capturing location;

DETAILED DESCRIPTION

Figure 1:
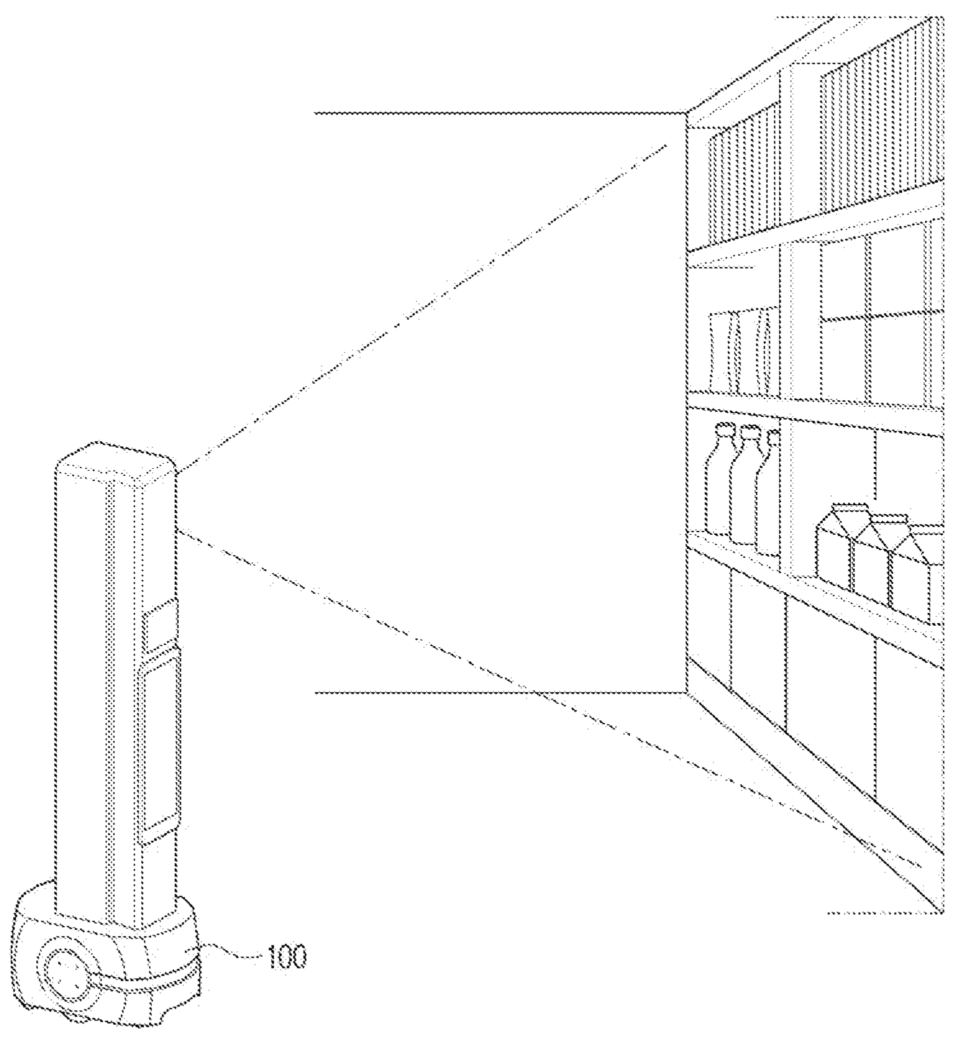
FIG. 1 is a diagram illustrating an operation of an electronic apparatus according to an embodiment of the disclosure.

Hereinafter, the disclosure will be described in detail with reference to the accompanying drawings.

As terms used in the embodiments of the disclosure, general terms that are currently used widely were selected where possible, in consideration of the functions described in the disclosure. However, the terms may vary depending on the intention of those skilled in the art who work in the pertinent field, previous court decisions, or emergence of new technologies. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor, except "a module" or "a part" that needs to be implemented as specific hardware.

Further, in this specification, the term "user" may refer to a person who uses an electronic apparatus or an apparatus using an electronic apparatus (e.g.: an artificial intelligence electronic apparatus).

Hereinafter, an embodiment of the disclosure will be described in more detail with reference to the accompanying drawings.

FIG. 1 is a diagram for illustrating an operation of an electronic apparatus according to an embodiment of the disclosure.

Referring to FIG. 1, an electronic apparatus 100 may capture (or photograph) an object on the front side through a camera. Here, the electronic apparatus 100 may mean a mobile apparatus including a camera. For example, the electronic apparatus 100 may be a mobile robot including a camera.

The electronic apparatus 100 may capture a target object on the front side through the camera. Here, the target object may mean an object that is intended to be captured by a user. For example, the target object may mean a label or a product itself. The electronic apparatus 100 may identify the target object based on the captured image, and acquire information corresponding to the target object based on the identified target object.

The electronic apparatus 100 may identify a label in the captured image, and acquire text information included in the label based on the identified label. In the acquired text information, at least one of the product name, the product number, the product type, the manufacturer of the product, the quantity of the product, or other information of the product may be included.

The electronic apparatus 100 may identify the product in the captured image, and in the information acquired based on the identified product, at least one of the product name, the product number, the product type, the manufacturer of the product, the quantity of the product, or other information of the product may be included.

The information acquired from the label included in the image may be information acquired from the captured label itself, and the information acquired from the product included in the image may be information acquired by analyzing the product image.

Figure 2:
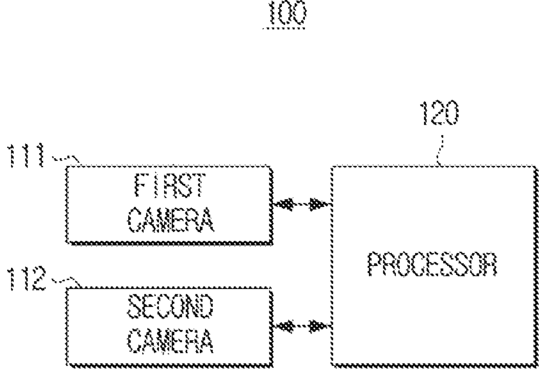
FIG. 2 is a block diagram illustrating an electronic apparatus according to an embodiment of the disclosure.

FIG. 2 is a block diagram illustrating an electronic apparatus according to an embodiment of the disclosure.

Referring to FIG. 2, the electronic apparatus 100 may consist of a first camera 111, a second camera 112, and a processor 120.

The first camera 111 may be a camera capturing a narrow angle image. The second camera 112 may be a camera capturing a wide angle image. Accordingly, the first camera 111 may capture in a first image capturing angle, and the second camera 112 may capture in a second capturing angle larger than the first image capturing angle.

The first camera 111 and the second camera 112 are components for capturing an image of an object and generating a captured image, where the captured image may include both a moving image and a still image. The first camera 111 and the second camera 112 may include an image for at least one external apparatus, and they may be implemented as a camera, a lens, an infrared sensor, etc.

The first camera 111 and the second camera 112 may include a lens and an image sensor. Each lens may be a generic-purpose lens, a wide angle lens, a zoom lens, etc., and the types may be determined based on the type, the characteristic, the use environment, etc. of the electronic apparatus 100. Each image sensor may be a complementary metal oxide semiconductor (CMOS), a charge coupled device (CCD), etc.

The first camera 111 and the second camera 112 output an incident light as an image signal. Specifically, the first camera 111 and the second camera 112 may include a lens, pixels, and an AD converter. The lens may gather light reflected from an object and make an optical image formed in an image capturing area, and the pixels may output the light introduced through the lens as an image signal in an analog form. Then, the AD converter may convert the image signal in an analog form into an image signal in a digital form, and output the signal. In particular, the first camera 111 and the second camera 112 may be arranged to capture the front surface direction of the electronic apparatus 100, and capture a user existing on the front surface of the electronic apparatus 100 and generate a captured image.

The processor 120 may perform overall control operations of the electronic apparatus 100. Specifically, the processor 120 performs a function of controlling the overall operations of the electronic apparatus 100.

The processor 120 may be implemented as a digital signal processor (DSP) processing digital signals, a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 120 may be implemented as a system on chip (SoC) having a processing algorithm stored therein or large scale integration (LSI), or in the form of a field programmable gate array (FPGA). Further, the processor 120 may perform various functions by executing computer executable instructions stored in a memory.

The electronic apparatus 100 according to an embodiment of the disclosure for achieving the aforementioned purpose includes a first camera 111 having a first image capturing angle, a second camera 112 having a second image capturing angle larger than the first image capturing angle, and a processor 120 configured to, based on a portion (an area not covered by an obstacle object) of a target object being identified and an obstacle object overlapping the other portion (an area covered by an obstacle object) of the target object being identified from a first captured image acquired from the first camera 111 or a second captured image acquired from the second camera 112, acquire location information of the identified obstacle object, identify a region of interest of the second captured image based on the acquired location information of the obstacle object, and identify the other portion of the target object based on the region of interest of the second captured image acquired from the second camera 112.

Here, the first camera 111 may be a narrow angle camera capturing in a first image capturing angle by using a narrow angle lens. Here, the second camera 112 may be a wide angle camera capturing in a second image capturing angle by using a wide angle lens. Accordingly, the second camera 112 may be considered a wide angle camera, and thus the second image capturing angle may be larger than the first image capturing angle. For purposes of this disclosure, the term "capturing" may be used interchangeably with the term "photographing".

The processor 120 may acquire the first captured image captured through the first camera 111, and acquire the second captured image captured through the second camera 112. Here, the image acquired through the first camera 111 may be a narrow angle image, and the image acquired through the second camera 112 may be a wide angle image.

The first captured image used for an operation of identifying an obstacle object and the second captured image used for identifying a region of interest may be images captured in different image capturing locations. As an example, the first captured image may be a narrow angle image captured on the front surface of an obstacle object, and the second captured image may be a wide angle image captured on the side surface (or the diagonal direction) of an obstacle object. Explanation regarding images acquired in different image capturing locations will be described later in FIG. 5 to FIG. 9.

Accordingly, the processor 120 may identify the other portion of the target object that could not be identified through the first captured image through the second captured image.

All areas of a target object are not necessarily needed for the processor 120 to determine whether an object included in an image is a target object. For example, it is assumed that a label in a size of 3 cm by 4 cm was determined in advance as a target object. The entire label does not have to be included in an image for the processor 120 to identify the label in a size of 3 cm by 4 cm in the acquired image. For example, in case a portion of the label is included in an image, the processor 120 may identify that the label is included in the image. Alternatively, the processor 120 may identify that the label is covered by an obstacle, or only a portion of the label was captured.

The processor 120 may identify a portion of the target object (e.g., a portion of the label) in at least one image between the captured first captured image or second captured image. Here, the target object (e.g., the label) may mean an object that the user intends to recognize. The target object may include a predetermined form (e.g., 3 cm by 4 cm). Here, the predetermined form may be a quadrangle form having a predetermined size. The processor 120 may identify the quadrangle form having the predetermined size in the acquired image.

The main embodiments of the disclosure assume a situation wherein an obstacle object is placed in front of a target object. In case the obstacle object covers the target object, only a portion of the target object may be identified in a captured image. However, the processor 120 may identify whether it is a target object just with the one portion.

Also, the portion other than the identified one portion of the target object may be overlapped by the obstacle object. Here, the processor 120 may identify the obstacle object. Then, the processor 120 may acquire location information of the identified obstacle object.

In addition, the processor 120 may identify a region of interest of the second captured image based on the location information of the identified obstacle object. Here, the region of interest may mean a partial area corresponding to the user's intention among the acquired entire image areas. Here, the region of interest may mean an area including at least one of the target object or the obstacle object. As an example, the region of interest may be an area wherein the target object is included, and as another example, it may be an area wherein both of the target object and the obstacle object are included.

Setting a region of interest may reduce the amount of processing required and the speed can be improved in image analysis and image processing. For example, it is assumed that the location information of the obstacle object is located on the right side in the entire image capturing range. The processor 120 may set the region of interest in the second captured image as the right side area based on the location information of the obstacle object.

The processor 120 may identify the other portion of the target object based on the region of interest of the second captured image. Here, the other portion may mean the portion covered by the obstacle object in the first captured image.

The processor 120 may also acquire a combined image including the entire image of the target object based on a region including the target object and the obstacle object in the first captured image and the region of interest of the second captured image, and identify the target object based on the acquired combined image.

For acquiring the complete information for the target object, the processor 120 may use the second captured image as well as the first captured image. In particular, the processor 120 may set a region of interest in the second captured image for increasing the data processing speed. The processor 120 may generate a combined image by combining the first captured image and the second captured image, and removing the obstacle object. Here, the combined image may mean a virtual image as the obstacle object was removed. An operation of generating a combined image will be described later in FIG. 10 to FIG. 12.

The first captured image may be an image captured by the first camera 111 in a first image capturing location, and the second captured image may be an image captured by the second camera 112 in a second image capturing location different from the first image capturing location.

Here, the first image capturing location may be a location corresponding to the front surface of the obstacle object. For example, the first image capturing location may be the second image capturing location 801 in FIG. 8. The second image capturing location may be a location corresponding to the side surface of the obstacle object. For example, the second image capturing location may be the first image capturing location 701 in FIG. 7 or the third image capturing location 901 in FIG. 9. An operation of setting a region of interest according to two captured images will be described later in FIG. 12.

The processor 120 may acquire a third captured image captured from the second camera 112 in a third image capturing location different from the first image capturing location and the second image capturing location, identify a region of interest of the third captured image based on the identified location information of the obstacle object, and identify the other portion of the target object based on the region of interest of the second captured image and the region of interest of the third captured image.

Here, the first captured image may have been acquired in the first image capturing location, the second captured image may have been acquired in the second image capturing location, and the third captured image may have been acquired in the third image capturing location. Here, all of the first image capturing location to the third image capturing location may be different. The processor 120 may identify a region of interest for the third captured image. Specifically, the processor 120 may identify an obstacle object in the third captured image, and identify an area corresponding to the identified obstacle object as a region of interest. Then, the processor 120 may identify the other portion (the portion covered by the obstacle object in the first captured image) of the target object based on the region of interest of the second captured image and the region of interest of the third captured image. Also, the processor 120 may use a portion of the first captured image for identifying the entire portion of the target object. For example, the processor 120 may identify the other portion of the target object in consideration of all of the one portion (the portion not covered by the obstacle object) of the first captured image, the region of interest of the second captured image, and the region of interest of the third captured image. An operation of setting a region of interest according to three captured images will be described later in FIG. 11.

Meanwhile, the second image capturing location may be located in a first direction based on the first image capturing location, and the third image capturing location may be located in a second direction different from the first direction based on the first image capturing location.

The first image capturing location may be a location wherein a narrow angle image which is the first captured image is acquired, and it may be a location corresponding to the front surface of the obstacle object. The second image capturing location and the third image capturing location may be locations corresponding to different diagonal side surface directions based on the obstacle object. For example, the second image capturing location may be a location corresponding to the left side (based on the direction toward the obstacle object from the electronic apparatus 100) in the first image capturing location (the front surface of the obstacle object). Meanwhile, the third image capturing location may be a location corresponding to the right side (based on the direction toward the obstacle object from the electronic apparatus 100) in the first image capturing location (the front surface of the obstacle object).

The processor 120 may identify a region of interest of the second captured image based on the direction information corresponding to the second image capturing location and the location information of the obstacle object and identify a region of interest of the third captured image based on the direction information corresponding to the third image capturing location and the location information of the obstacle object.

Here, the direction information wherein the second captured image was captured corresponds to the left side based on the first image capturing location. Also, the direction information wherein the second captured image was captured may be 5 degrees to 10 degrees on the right side based on the image capturing direction. Further, the direction information wherein the third captured image was captured may correspond to the right side based on the first image capturing location. In addition, the direction information wherein the third captured image was captured may be 5 degrees to 10 degrees on the left side based on the image capturing direction.

Figure 12:
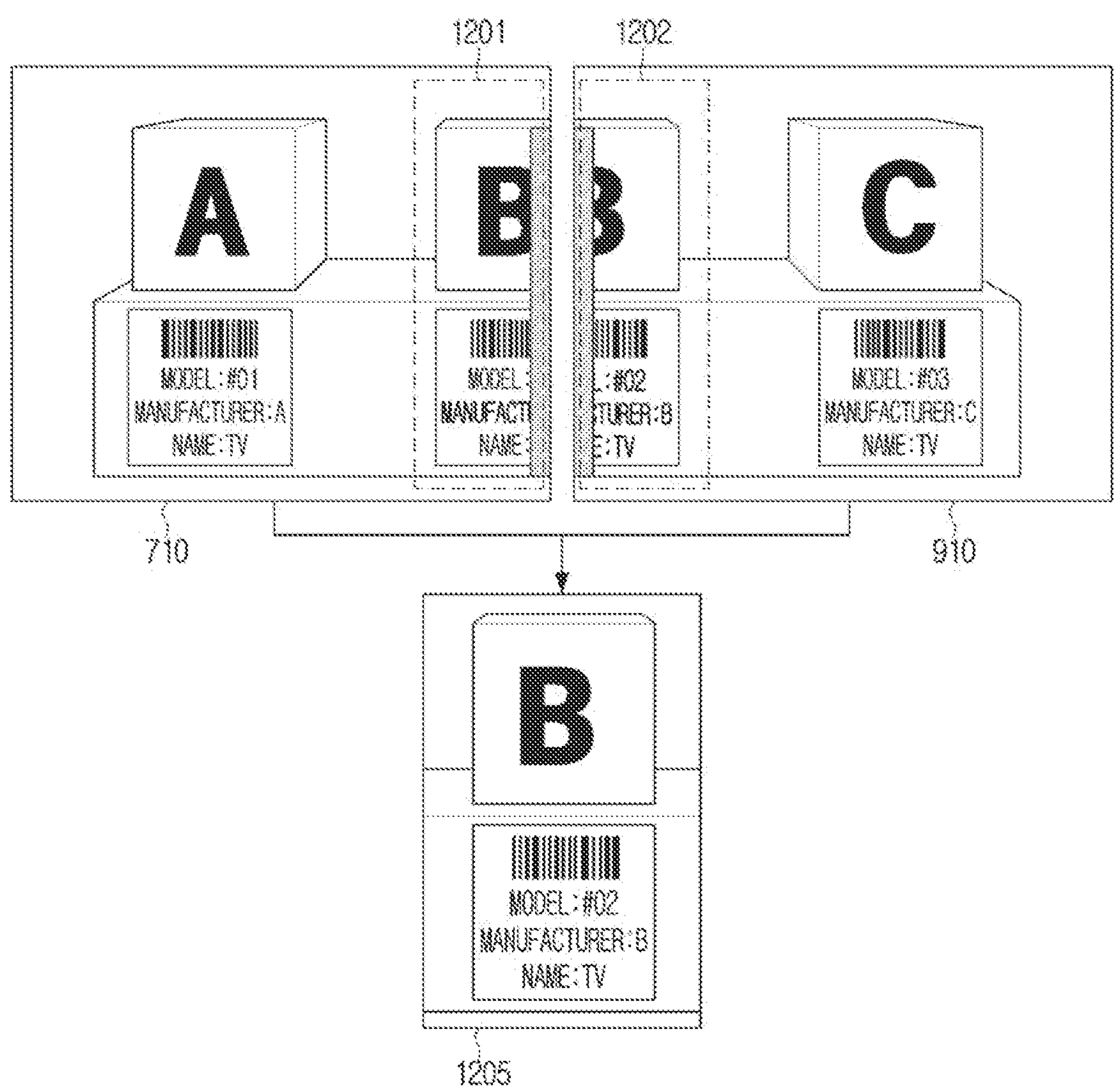
FIG. 12 is a diagram illustrating an operation of generating a combined image according to another embodiment of the disclosure.

For example, in FIG. 12, the region of interest 1201 of the wide angle image 710 may be located on the right side in the entire image, and the region of interest 1202 of the wide angle image 910 may be located on the left side in the entire image.

The processor 120 may acquire first information (information corresponding to the area that was not covered by the obstacle based on the first captured image) of the target object based on a portion of the target object identified in the first captured image, and acquire second information (information on the area that could not be identified as it was covered by the obstacle based on the first captured image) of the target object based on the other portion of the target object identified in the second captured image.

The processor 120 may acquire different kinds of information although it identifies the same object in the respective captured images. This is because a portion of the target object included in the first captured image was covered. Accordingly, the processor 120 may acquire partial information (the first information) of the target object in the first captured image acquired through the first camera 111, and acquire the other information (the second information) of the target object in the second captured image acquired through the second camera 112.

The processor 120 may identify location information and size information of the obstacle object based on the first captured image, and identify the image capturing location of the second camera 112 based on the identified location information and size information of the obstacle object, and the second captured image may be an image captured in the identified image capturing location.

The processor 120 may determine the second captured image corresponding to which location will be identified based on the location information and size information of the obstacle. If the size of the obstacle object becomes bigger, the second image capturing location wherein the second captured image is identified may become farther from the first image capturing location. If the size of the obstacle object becomes smaller, the second image capturing location wherein the second captured image is identified may become closer from the first image capturing location. That is, the distance between the first image capturing location and the second image capturing location may be in proportion to the size of the obstacle object.

Here, the processor 120 may identify the location information and size information of the obstacle based on moving of the electronic apparatus 100 and the arrangement structure of the camera module 110. Here, the arrangement structure of the camera module 110 may mean geometry between the first camera 111 and the second camera 112.

The electronic apparatus 100 may further include a light emitter 130, and the processor 120 may identify a region of interest of the first captured image, identify a location corresponding to an adjacent area to the region of interest of the first captured image and the region of interest of the second captured image, and control the light emitter 130 to irradiate a light greater than or equal to threshold strength on the identified location.

A specific operation related to the light emitter 130 will be described later in FIG. 14 to FIG. 19.

The processor 120 may change the light emitting angle of the light emitter 130 such that a light is irradiated on the identified location.

According to an embodiment, an irradiation area may be changed according to a region of interest. The processor 120 may identify a region of interest in a captured image based on a target object and an obstacle object. Accordingly, if the region of interest is changed, the irradiation area may also be changed. The processor 120 may change the light emitting angle of the light emitter 130 to irradiate a light on the changed irradiation area.

According to another embodiment, the irradiation area may be determined based on the previously stored data, and the processor 120 may control the light emitter 130 such that a light is irradiated on the determined irradiation area. Here, the irradiation area may be fixed while one driving operation is being performed. For example, the processor 120 may determine an optimal irradiation area by putting together the records of regions of interest stored during the first driving, and irradiate a light on the determined irradiation area during the second driving.

According to another embodiment, the light emitter 130 may be arranged such that a light is irradiated at an optimal angle. For example, the user may determine an irradiation area through various data, and determine an optimal light emitting angle for irradiating a light on the irradiation area. Then, the light emitter 130 may be arranged such that the light is irradiated at the optimal light emitting angle. For example, a light emitting module included in the light emitter 130 may be arranged to be toward 5 degrees on the left side based on the front surface. Here, 5 degrees on the left side may correspond to the optimal light emitting angle, and the optimal light emitting angle may be changed according to the user setting.

The electronic apparatus 100 according to an embodiment of the disclosure may identify an obstacle object through a narrow angle image, and when an obstacle object is identified through the narrow angle image, the electronic apparatus 100 may analyze a target object by using a wide angle image in a subsidiary manner. In particular, the narrow angle image was acquired in the first image capturing location and the wide angle image was acquired in the second image capturing location different from the first image capturing location, and thus the images may be complementary to each other. Accordingly, the electronic apparatus 100 may analyze the target object covered by the obstacle object.

The electronic apparatus 100 according to an embodiment of the disclosure may determine a space between regions of interest as an irradiation area, and irradiate a light of the maximum strength. By irradiating a light of the maximum strength on a space which is not a region of interest, the electronic apparatus 100 may decrease the amount of light reflected off of the object to the minimum. Accordingly, the recognition rate of the target object included in the image can be increased. Here, the light of the maximum strength may mean the brightest light among the lights that the electronic apparatus 100 can currently irradiate. Also, the light of the maximum strength may correspond to an illumination peak. According to another implementation example, the electronic apparatus 100 may irradiate a light of appropriate strength on the irradiation area.

The electronic apparatus 100 according to an embodiment of the disclosure may identify a phenomenon wherein information of a target object cannot be correctly identified by an obstacle object as one event. Accordingly, if a predetermined event is identified, the electronic apparatus 100 may select an appropriate wide angle image, and generate a combined image through a stitching operation. Here, as the predetermined event, there may be an event wherein the target object is covered by the obstacle object, an event wherein information of the target object is not identified, an event wherein the bar code is covered by the obstacle object, etc.

Meanwhile, in case a predetermined event does not occur during a predetermined threshold time, the electronic apparatus 100 may delete a plurality of images (images captured in various locations) stored in the memory 160. Continuously storing images captured in all locations repetitively may be ineffective. Accordingly, in case a predetermined event does not occur for greater than or equal to the threshold time, the electronic apparatus 100 may delete the plurality of stored images through the processor 120.

According to another embodiment, the electronic apparatus 100 may delete an image with a capture time that is after a threshold time or longer. For example, the electronic apparatus 100 may automatically delete an image for which 10 seconds or longer passed after it was captured.

If a portion of a target object is identified based on a captured image acquired from at least one camera between the first camera 111 or the second camera 112, the processor 120 may analyze the captured image for identifying an obstacle object overlapped to the other portion (the area covered by the obstacle object) of the target object. The processor 120 may identify the location of the obstacle object in a situation where even just a portion of the target object was identified in at least one captured image between the acquired first captured image and second captured image.

According to another implementation example, even if a portion of the target object is not identified, the obstacle object can be identified by using a planogram or conventional shelf data.

In the above, only simple components constituting the electronic apparatus 100 were illustrated and explained, but in actual implementation, various components may additionally be included. Explanation in this regard will be described below with reference to FIG. 3.

Figure 3:
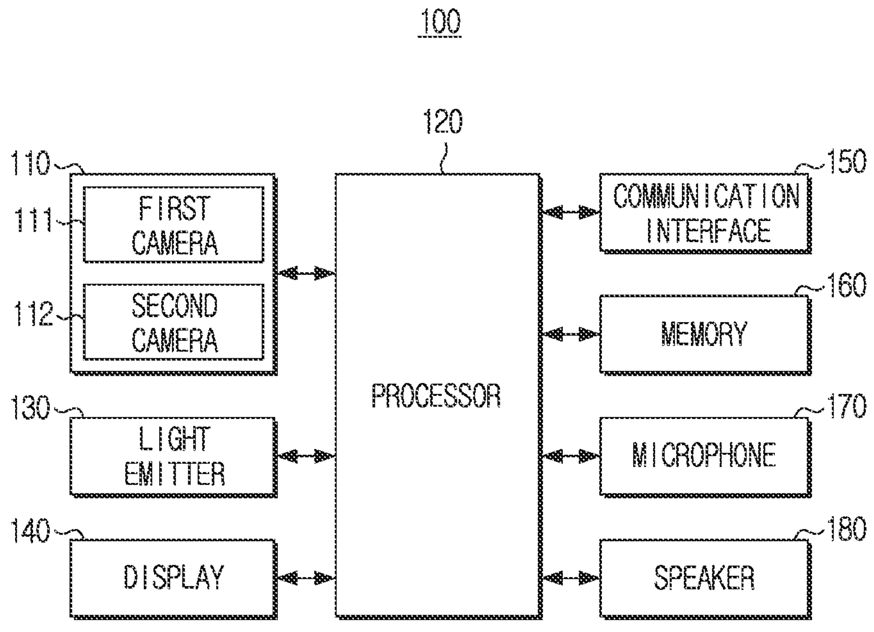
FIG. 3 is a block diagram illustrating a detailed configuration of the electronic apparatus of FIG. 2.

FIG. 3 is a block diagram for illustrating a detailed configuration of the electronic apparatus in FIG. 2.

Referring to FIG. 3, the electronic apparatus 100 may consist of a first camera 111, a second camera 112, a processor 120, a display 140, a communication interface 150, a memory 160, a microphone 170, and a speaker 180.

With regard to the operations of the first camera 111, the second camera 112, and the processor 120, regarding the same operations as those described above, overlapping explanation will be omitted.

The first camera 111 and the second camera 112 may be included in the camera module 110. The camera module 110 may consist of one piece of hardware, and the first camera 111 and the second camera 112 may be implemented in a form of being arranged in parallel on one camera module 110.

The light emitter 130 may mean a module irradiating a light on a predetermined area or in a predetermined direction. Here, the light emitter 130 may mean a camera flash used for an image capturing operation, and it may be implemented in a form of a lamp or a light emitting diode. Also, the light emitter 130 may be expressed as an illumination module.

The display 140 may be implemented as displays in various forms such as a liquid crystal display (LCD), an organic light emitting diodes (OLED) display, a plasma display panel (PDP), etc. Inside the display 140, driving circuits that may be implemented in forms such as an a-si TFT, a low temperature poly silicon (LTPS) TFT, an organic TFT (OTFT), etc., a backlight unit, and the like may also be included together. Meanwhile, the display 140 may be implemented as a touch screen combined with a touch sensor, a flexible display, a 3D display, etc.

Also, the display 140 according to an embodiment of the disclosure may include not only a display panel outputting images, but also a bezel housing the display panel. In particular, the bezel according to an embodiment of the disclosure may include a touch sensor for detecting a user interaction.

The communication interface 150 is a component that performs communication with various types of external apparatuses according to various types of communication methods. The communication interface 150 includes a Wi-Fi module, a Bluetooth module, an infrared communication module, and a wireless communication module, etc. Here, each communication module may be implemented in the form of at least one hardware chip.

The Wi-Fi module and the Bluetooth module perform communication by a Wi-Fi method and a Bluetooth method, respectively. In the case of using the Wi-Fi module or the Bluetooth module, various types of connection information such as an SSID or a session key is transmitted and received first, and connection of communication is performed by using the information, and various types of information can be transmitted and received thereafter.

The infrared communication module performs communication according to an infrared Data Association (IrDA) technology of transmitting data to a near field wirelessly by using infrared rays between visible rays and millimeter waves.

The wireless communication module may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

Other than the above, the communication interface 150 may include at least one of a local area network (LAN) module, an Ethernet module, or a wired communication module that performs communication by using a pair cable, a coaxial cable, an optical fiber cable, or an ultra wide-band (UWB) module, etc.

According to an embodiment, the communication interface 150 may use the same communication module (e.g., a Wi-Fi module) for communicating with an external apparatus such as a remote control and an external server.

According to another embodiment, the communication interface 150 may use different communication modules (e.g., a Wi-Fi module) for communicating with an external apparatus such as a remote control and an external server. For example, the communication interface 150 may use at least one of an Ethernet module or a Wi-Fi module for communicating with an external server, or use a BT module for communicating with an external apparatus such as a remote control. However, this is merely an example, and the communication interface 150 may use at least one communication module among various communication modules in the case of communicating with a plurality of external apparatuses or external servers.

The memory 160 may be implemented as an internal memory such as a ROM (e.g., an electrically erasable programmable read-only memory (EEPROM)), a RAM, etc. included in the processor 120, or a memory separate from the processor 120. In this case, the memory 160 may be implemented in the form of a memory embedded in the electronic apparatus 100, or in the form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100.

Meanwhile, in the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the electronic apparatus 100, the memory may be implemented in forms such as a memory card (e.g., compact flash (CF), secure digital (SD), micro secure digital (Micro-SD), mini secure digital (Mini- SD), extreme digital (xD), a multi-media card (MMC), etc.), an external memory that can be connected to a USB port (e.g., a USB memory), etc.

The electronic apparatus 100 may further include a microphone 170. The microphone is a component for receiving input of a user voice or other sounds, and converting them into audio data.

The microphone 170 may receive a user's voice in an activated state. For example, the microphone 170 may be formed as an integrated type on the upper side or the front surface direction, the side surface direction, etc. of the electronic apparatus 100. The microphone 170 may include various components such as a microphone collecting a user voice in an analog form, an amp circuit amplifying the collected user voice, an A/D conversion circuit that samples the amplified user voice and converts the user voice into a digital signal, a filter circuit that removes noise components from the converted digital signal, etc.

The electronic apparatus 100 may include a speaker 180. The speaker 180 may be a component that outputs not only various kinds of audio data processed at an input/output interface, but also various kinds of notification sounds or voice messages, etc.

Figure 4:
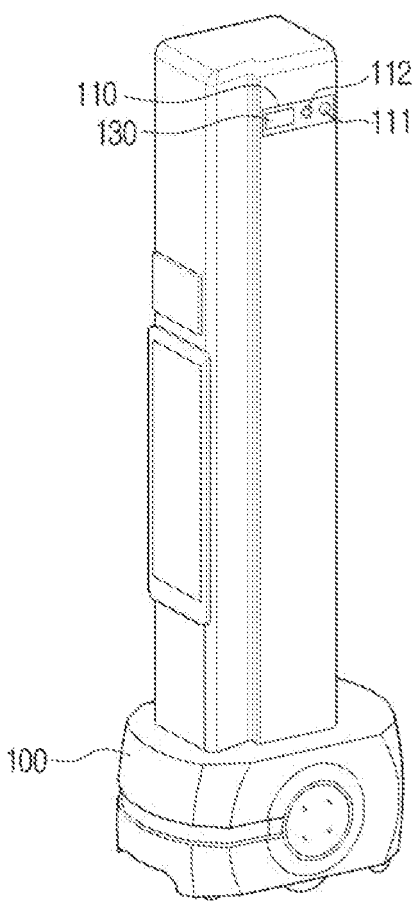
FIG. 4 is a diagram illustrating a camera module included in an electronic apparatus according to an embodiment of the disclosure.

FIG. 4 is a diagram for illustrating a camera module included in an electronic apparatus according to an embodiment of the disclosure.

Referring to FIG. 4, the electronic apparatus 100 may include a camera module 110. Also, the camera module 110 may include a first camera 111, a second camera 112, and a light emitter 130. Further, the electronic apparatus 100 may include a wheel in the lower end part of the electronic apparatus 100, and the electronic apparatus 100 may move by using the wheel.

Meanwhile, the arrangement locations of the first camera 111, the second camera 112, and the light emitter 130 may vary depending on implementation examples.

Figure 5:
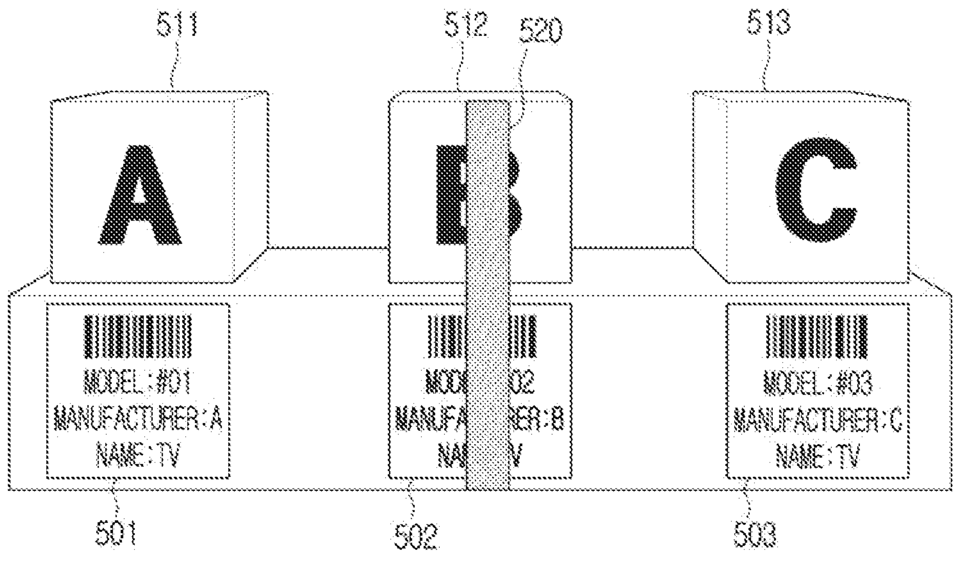
FIG. 5 is a diagram illustrating an operation of an electronic apparatus identifying a target object and an obstacle object according to an embodiment of the disclosure.
Figure 5:
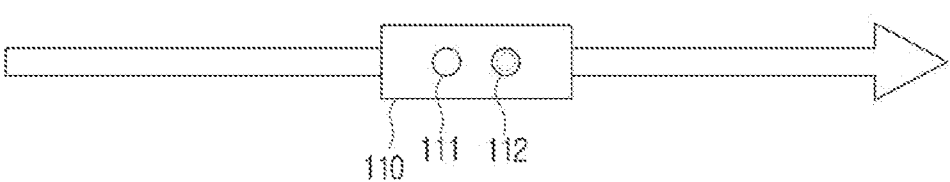

FIG. 5 is a diagram for illustrating an operation of an electronic apparatus of identifying a target object and an obstacle object.

Referring to FIG. 5, the electronic apparatus 100 may capture the front side by using the first camera 111 and the second camera 112. Here, the first camera 111 and the second camera 112 may be included in the camera module 110.

It is assumed that there are an A label 501, a B label 502, and a C label 503 on the front side of the electronic apparatus 100, and an A product 511 corresponding to the A label 501, a B product 512 corresponding to the B label 502, and a C product 513 corresponding to the C label 503 exist. Here, the A label 501, the B label 502, and the C label 503 may also be expressed as a first label, a second label, and a third label. Also, the A product 511, the B product 512, and the C product 513 may also be expressed as a first product, a second product, and a third product.

Here, the target object may mean an object in a form that was determined by the user in advance. As an example, there may be one target object. The user may set a label in a quadrangle form in a specific size as the target object. For example, the target object may be the A label 501, the B label 502, and the C label 503.

As another example, there may be a plurality of target objects. The user may set a label in a quadrangle form in a specific size as a target object, and set a product within a threshold distance from the label as a target object. For example, the target object may be the A label 501, the B label 502, the C label 503, the A product 511, the B product 512, and the C product 513.

As still another example, the electronic apparatus 100 may recognize a target object for each group. The electronic apparatus 100 may recognize a first group including the A label 501 and the A product 511 as a target object, recognize a second group including the B label 502 and the B product 512 as a target object, and recognize a third group including the C label 503 and the C product 513 as a target object.

A situation wherein an obstacle object 520 exists in an adjacent space to the target object is assumed. The obstacle object 520 may cover a portion of the target object. Accordingly, the entire areas of the B label 502 and the B product 512 may not be identified in the captured image, but only some areas may be identified.

The electronic apparatus 100 may move from the left side to the right side based on the direction that the first camera 111 and the second camera 112 view the target object. In the drawings described below, explanation will be described based on an embodiment wherein the electronic apparatus 100 moves from the left side to the right side.

However, depending on implementation examples, the moving direction may be from the right side to the left side. Also, the moving direction may be a direction of moving toward the target object, or a direction of moving away from the target object.

Figure 6:
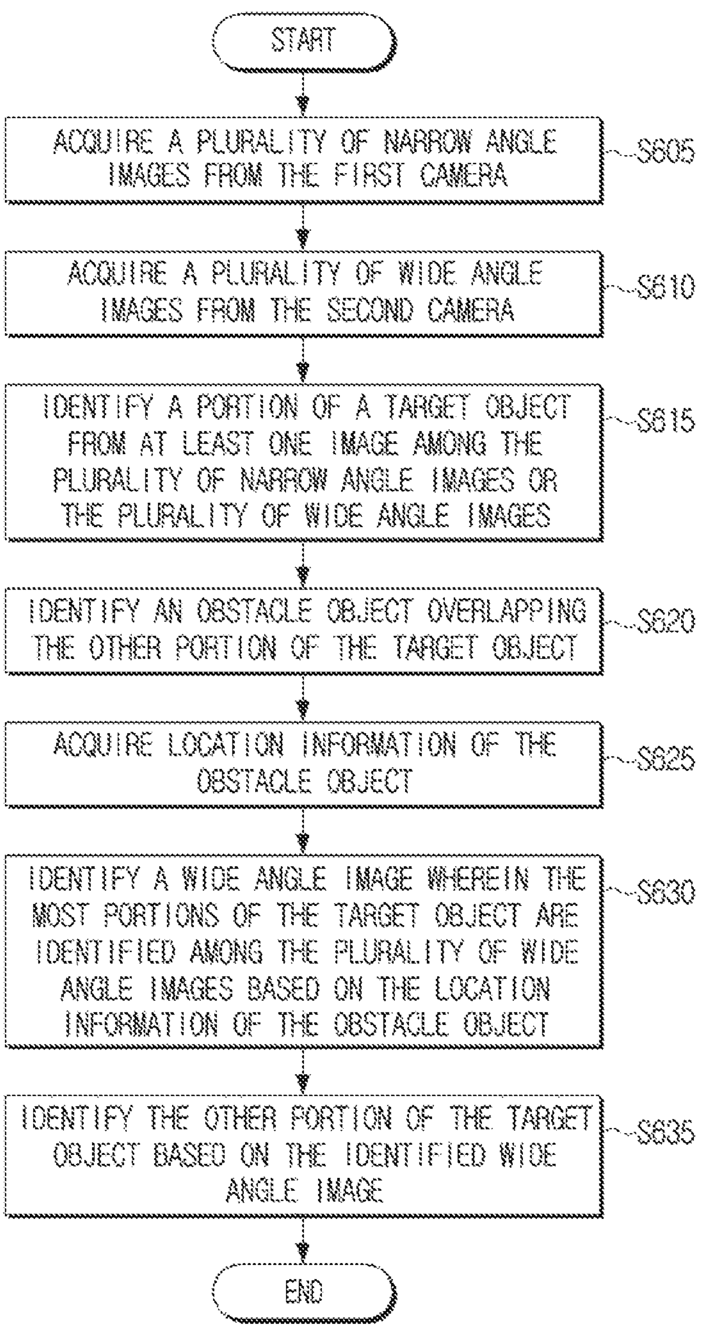
FIG. 6 is a flow chart illustrating an operation of identifying the entire area of a target object according to an embodiment of the disclosure.

FIG. 6 is a flow chart for illustrating an operation of identifying the entire area of a target object.

Referring to FIG. 6, the electronic apparatus 100 may acquire a plurality of narrow angle images from the first camera 111 in operation S605. Also, the electronic apparatus 100 may acquire a plurality of wide angle images from the second camera 112 in operation S610. Here, the electronic apparatus 100 may identify a portion of a target object from at least one image among the plurality of narrow angle images and the plurality of wide angle images in operation S615. Here, the portion of the target object may mean an area that is identified in the object without being covered by an obstacle object. The electronic apparatus 100 may identify that the object is the target object based on the portion of the target object that is identified without being covered by the obstacle object. Also, the electronic apparatus 100 may identify the obstacle object that is overlapped to the other portion of the target object in operation S620. Further, the electronic apparatus 100 may acquire location information of the acquired obstacle object in operation S625. In addition, the electronic apparatus 100 may identify a wide angle image wherein the most portions of the target object are identified among the plurality of wide angle images based on the location information of the obstacle object in operation S630. Also, the electronic apparatus 100 may identify the other portion of the target object based on the identified wide angle image in operation S635.

For example, the electronic apparatus 100 may identify a portion of the B label 502 based on at least one image among the plurality of images acquired from the first camera 111 or the second camera 112. In case only a portion of the B label 502 was identified instead of the entire parts, the electronic apparatus 100 may identify that the object is the target object. Also, the electronic apparatus 100 may identify an obstacle object 520 covering the other portion of the B label 502, and identify location information of the obstacle object 520. Further, the electronic apparatus 100 may identify a wide angle image wherein the most of the other portion of the B label 502 is identified, which was not identified as it was covered by the obstacle object 520, among the plurality of wide angle images that were stored during the moving process. Then, the electronic apparatus 100 may identify the other portion of the B label 502 that was covered by the obstacle object based on the identified wide angle image.

Figure 7:
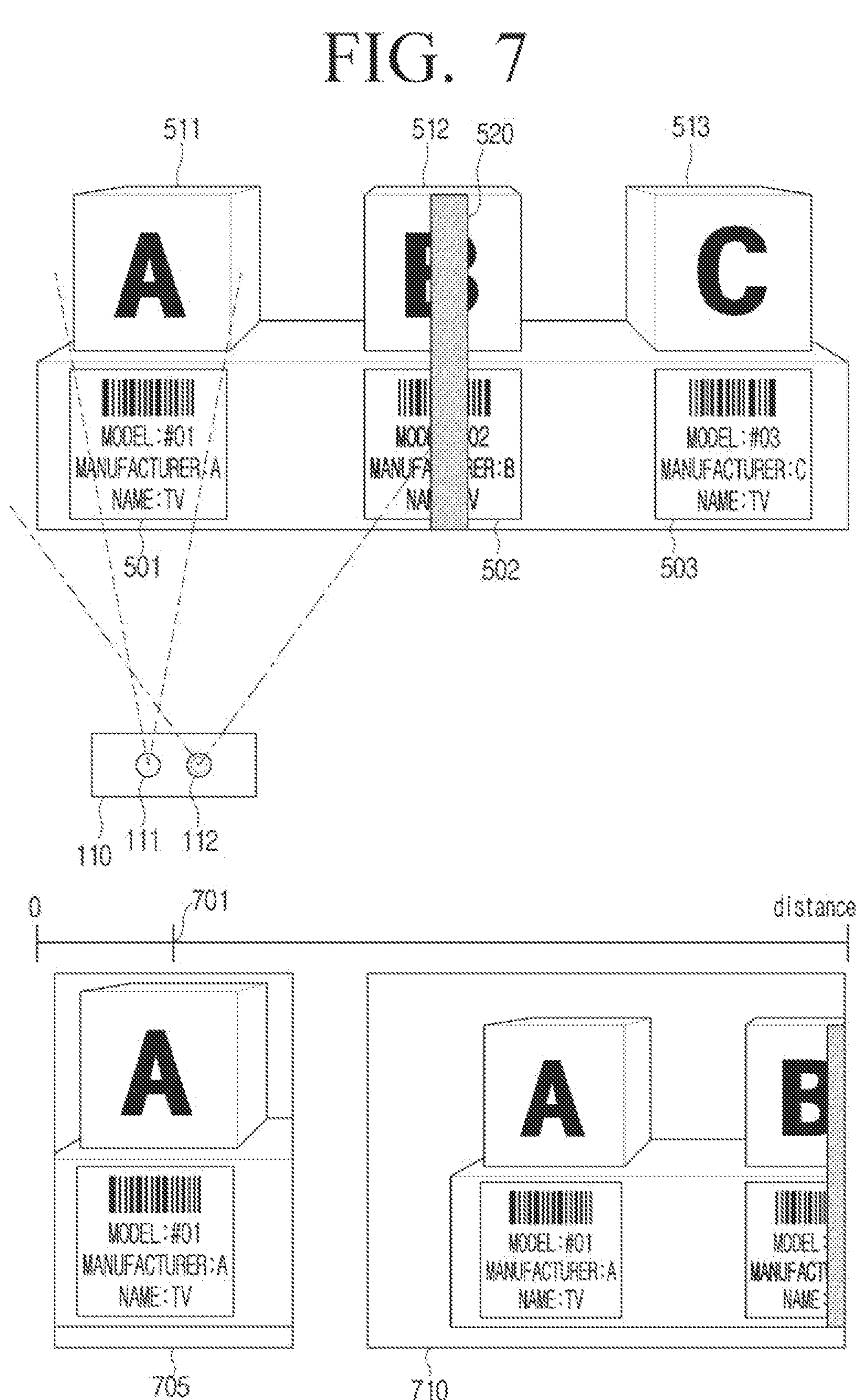
FIG. 7 is a diagram illustrating an image captured in a first image capturing location.

FIG. 7 is a diagram for illustrating an image captured in a first image capturing location.

Referring to FIG. 7, the electronic apparatus 100 may capture the front side in the first image capturing location 701. Here, the first image capturing location 701 may be the front surfaces of the A label 501 and the A product 511. The electronic apparatus 100 may acquire captured images of the same time point through the first camera 111 and the second camera 112.

The electronic apparatus 100 may acquire a narrow angle image 705 including the A label 501 and the A product 511 through the first camera 111. Here, the narrow angle image 705 may be a narrow angle image captured with a narrow angle lens.

Also, the electronic apparatus 100 may acquire a wide angle image 710 including the A label 501, the A product 511, the B label 502, and the B product 512 through the second camera 112. Here, the wide angle image 710 may be a wide angle image captured with a wide angle lens. Also, the B label 502 and the B product 512 included in the wide angle image 710 may be partially overlapped with the obstacle object 520.

Figure 8:
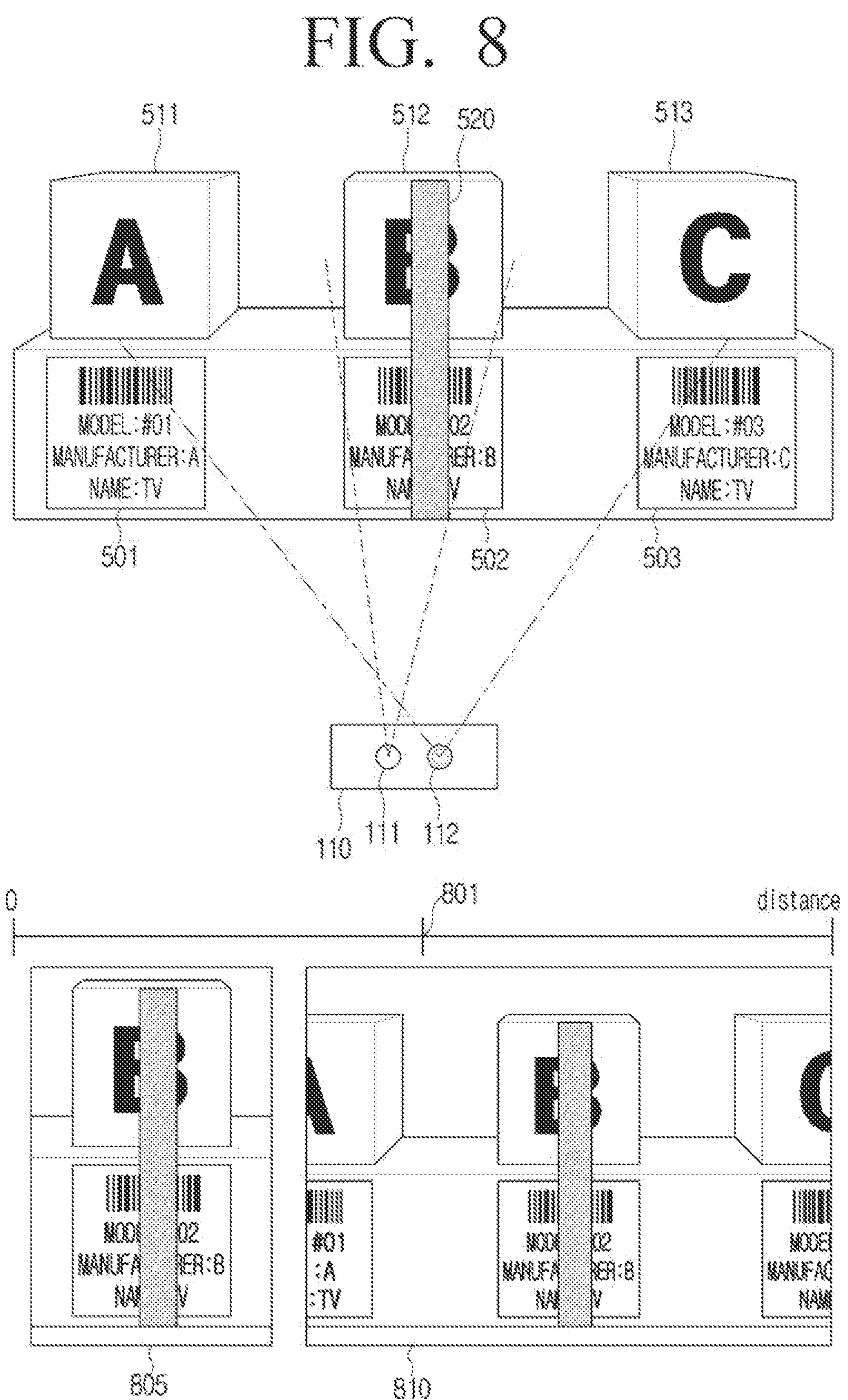
FIG. 8 is a diagram illustrating an image captured in a second image capturing location.

FIG. 8 is a diagram for illustrating an image captured in a second image capturing location.

Referring to FIG. 8, the electronic apparatus 100 may capture the front side in the second image capturing location 801. Here, the second image capturing location 801 may be the front surfaces of the B label 502 and the B product 512. The electronic apparatus 100 may acquire captured images of the same time point through the first camera 111 and the second camera 112.

The electronic apparatus 100 may acquire a narrow angle image 805 including the B label 502 and the B product 512 through the first camera 111. Here, the narrow angle image 805 may be a narrow angle image captured with a narrow angle lens.

Also, the electronic apparatus 100 may acquire a wide angle image 810 including the A label 501, the A product 511, the B label 502, the B product 512, the C label 503, and the C product 513 through the second camera 112. Here, the wide angle image 810 may be a wide angle image captured with a wide angle lens. Also, the B label 502 and the B product 512 included in the wide angle image 810 may be partially overlapped with the obstacle object 520. Here, the A label 501, the A product 511, the C label 503, and the C product 513 may not be overlapped with the obstacle object 520.

Figure 9:
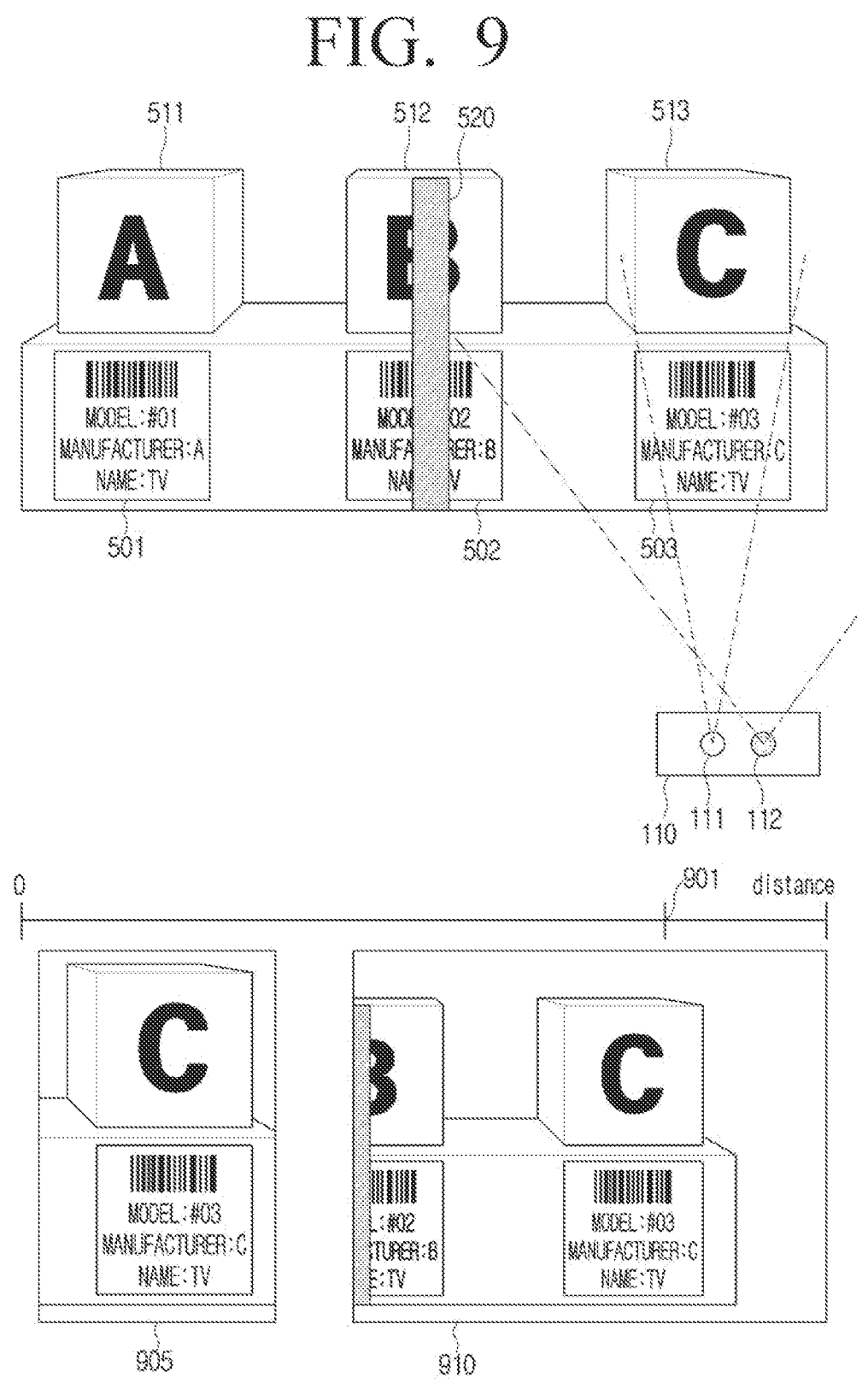

FIG. 9 is a diagram for illustrating an image captured in a third image capturing location.

Referring to FIG. 9, the electronic apparatus 100 may capture the front side in the third image capturing location 901. Here, the third image capturing location 901 may be the front surfaces of the C label 503 and the C product 513. The electronic apparatus 100 may acquire captured images of the same time point through the first camera 111 and the second camera 112.

The electronic apparatus 100 may acquire a narrow angle image 905 including the C label 503 and the C product 513 through the first camera 111. Here, the narrow angle image 905 may be a narrow angle image captured with a narrow angle lens.

Also, the electronic apparatus 100 may acquire a wide angle image 910 including the B label 502, the B product 512, the C label 503, and the C product 513 through the second camera 112. Here, the wide angle image 910 may be a wide angle image captured with a wide angle lens. Also, the B label 502 and the B product 512 included in the wide angle image 910 may be partially overlapped with the obstacle object 520.

Figure 10:
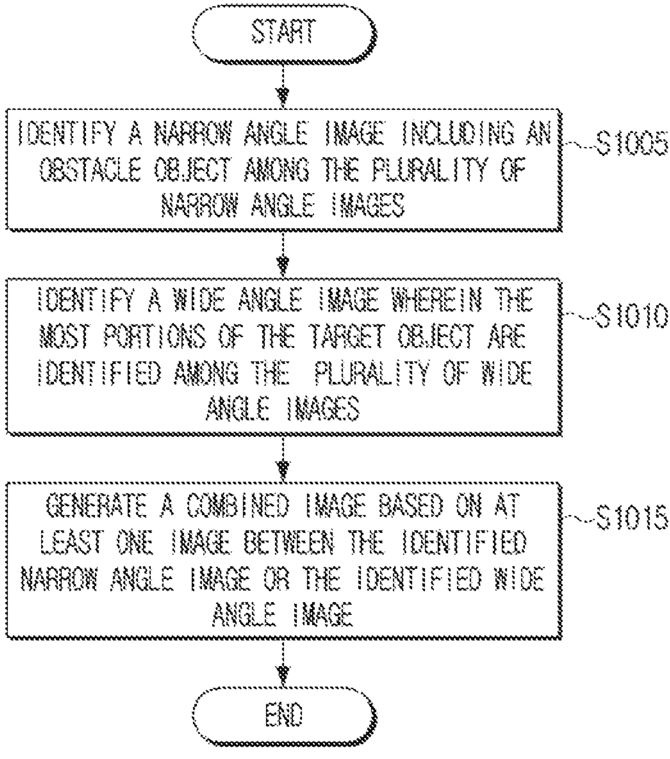
FIG. 10 is a flow chart illustrating an operation of generating a combined image according to an embodiment of the disclosure.

FIG. 10 is a flow chart for illustrating an operation of generating a combined image.

Referring to FIG. 10, the electronic apparatus 100 may store a plurality of narrow angle images and a plurality of wide angle images captured in various locations in the memory 160. Here, the electronic apparatus 100 may identify a narrow angle image including an obstacle object among the plurality of narrow angle images in operation S1005. Here, the narrow angle image may mean an image acquired from the first camera 111 including a narrow angle lens. Accordingly, the electronic apparatus 100 may identify an obstacle object based on the narrow angle image which is an image in a narrow angle. Here, the narrow angle image may be an image that captured an object on the front surface.

Also, the electronic apparatus 100 may identify a wide angle image wherein the most portions of the target object are identified among the plurality of wide angle images stored in the memory 160 in operation S1010. Through the operation S1005, the electronic apparatus 100 may determine that the obstacle object is located on the front side. Also, the electronic apparatus 100 may identify a portion of the target object covered by the obstacle through an image captured in a different image capturing location. For determining the portion covered by the obstacle, the electronic apparatus 100 may identify an image wherein the most portions of the target object are identified among the plurality of wide angle images which are images in a wide angle. Here, the electronic apparatus 100 does not simply find an image wherein the most portions of the target object are identified, but may find an image having a definition to a degree that analysis for the portion is possible at the same time.

Also, the electronic apparatus 100 may generate a combined image based on at least one image between the identified narrow angle image and the identified wide angle image in operation S1015. Here, the wide angle image may include a plurality of wide angle images. Here, the combined image may be an image wherein the obstacle object is not included. That is, in an embodiment wherein an obstacle object exists in front of a target object, the electronic apparatus 100 may generate a combined image which is a virtual image, and acquire an image wherein only the target object exists without the obstacle object.

For example, in an embodiment wherein the obstacle object 520 exists in front of the B label 502 and the B product 512, the electronic apparatus 100 may acquire a narrow angle image 805 in the second image capturing location 801. Then, the electronic apparatus 100 may identify that the obstacle object 520 exists in the B label 502 and the B product 512 based on the narrow angle image 805. The electronic apparatus 100 cannot acquire complete information on the B label 502 and the B product 512 through the narrow angle image 805. This is because the B label 502 and the B product 512 included in the narrow angle image 805 are partially overlapped with the obstacle object 520. Accordingly, the electronic apparatus 100 may additionally use an image captured in a different location (or a different angle). Specifically, the electronic apparatus 100 may identify a wide angle image which is not overlapped with the obstacle object 520 and wherein the B label 502 and the B product 512 can be identified among the plurality of wide angle images stored in the memory 160. Here, the identified wide angle image may be a wide angle image captured in a different location that is not the second image capturing location 801. The identified wide angle image may be at least one image between the wide angle image 710 captured in the first image capturing location 701 and the wide angle image 910 captured in the third image capturing location 901. The electronic apparatus 100 may generate a combined image based on at least one image among the narrow angle image 805, the wide angle image 710, or the third image capturing location 901. Here, the combined image may be an image wherein the obstacle object 520 does not exist in front of the B label 502 and the B product 512.

Figure 11:
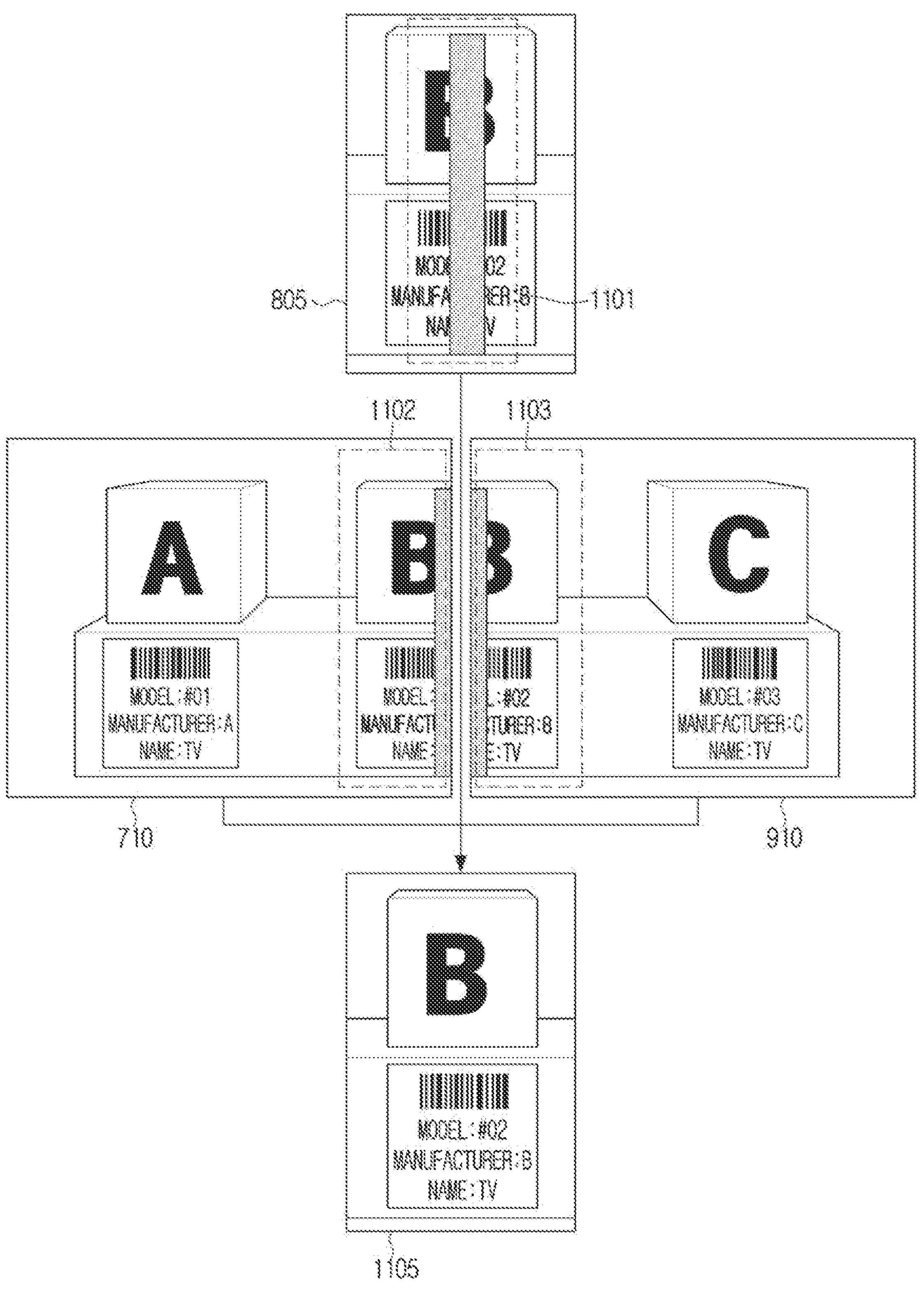
FIG. 11 is a diagram illustrating an operation of generating a combined image according to an embodiment of the disclosure.

FIG. 11 is a diagram for illustrating an operation of generating a combined image according to an embodiment.

Referring to FIG. 11, the electronic apparatus 100 may generate a combined image 1105 based on the narrow angle image 805 captured in the second image capturing location 801, the wide angle image 710 captured in the first image capturing location 701, and the wide angle image 910 captured in the third image capturing location 901. Here, the narrow angle image 805 may be an image captured through a narrow angle lens, and the wide angle image 710 and the wide angle image 910 may be images captured through a wide angle lens.

Here, the electronic apparatus 100 may generate a combined image based on the regions of interest of each captured image. The electronic apparatus 100 may identify the region of interest 1101 of the narrow angle image 805 based on a target object and an obstacle object. Then, the electronic apparatus 100 may identify the region of interest 1102 of the wide angle image 710. Then, the electronic apparatus 100 may identify the region of interest 1103 of the wide angle image 910.

Also, the combined image 1105 may be a virtual image from which the obstacle object 520 was removed. The user may identify the entire area of the target object through the image from which the obstacle object 520 was removed, and acquire complete information of the target object.

Here, as the narrow angle image 805 is an image in a narrow angle, and the wide angle image 710 and the wide angle image 910 are images in wide angles, some of the ratios may be different. Accordingly, the electronic apparatus 100 may convert the wide angle images into ratios corresponding to the narrow angle image, and generate the combined image 1105 based on the converted images.

FIG. 12 is a diagram for illustrating an operation of generating a combined image according to another embodiment.

Referring to FIG. 12, the electronic apparatus 100 may generate a combined image 1205 based on the wide angle image 710 and the wide angle image 910. Here, the electronic apparatus 100 may identify the region of interest 1201 of the wide angle image 710 and identify the region of interest 1202 of the wide angle image 910 based on a target object and an obstacle object. Then, the electronic apparatus 100 may generate the combined image 1205 based on the regions of interest 1201, 1202 of each of the wide angle images.

Here, the wide angle image 710 and the wide angle image 910 may be images captured through the wide angle lens. Here, the combined image 1205 may be a virtual image from which the image corresponding to the obstacle object 520 was removed.

Figure 13:
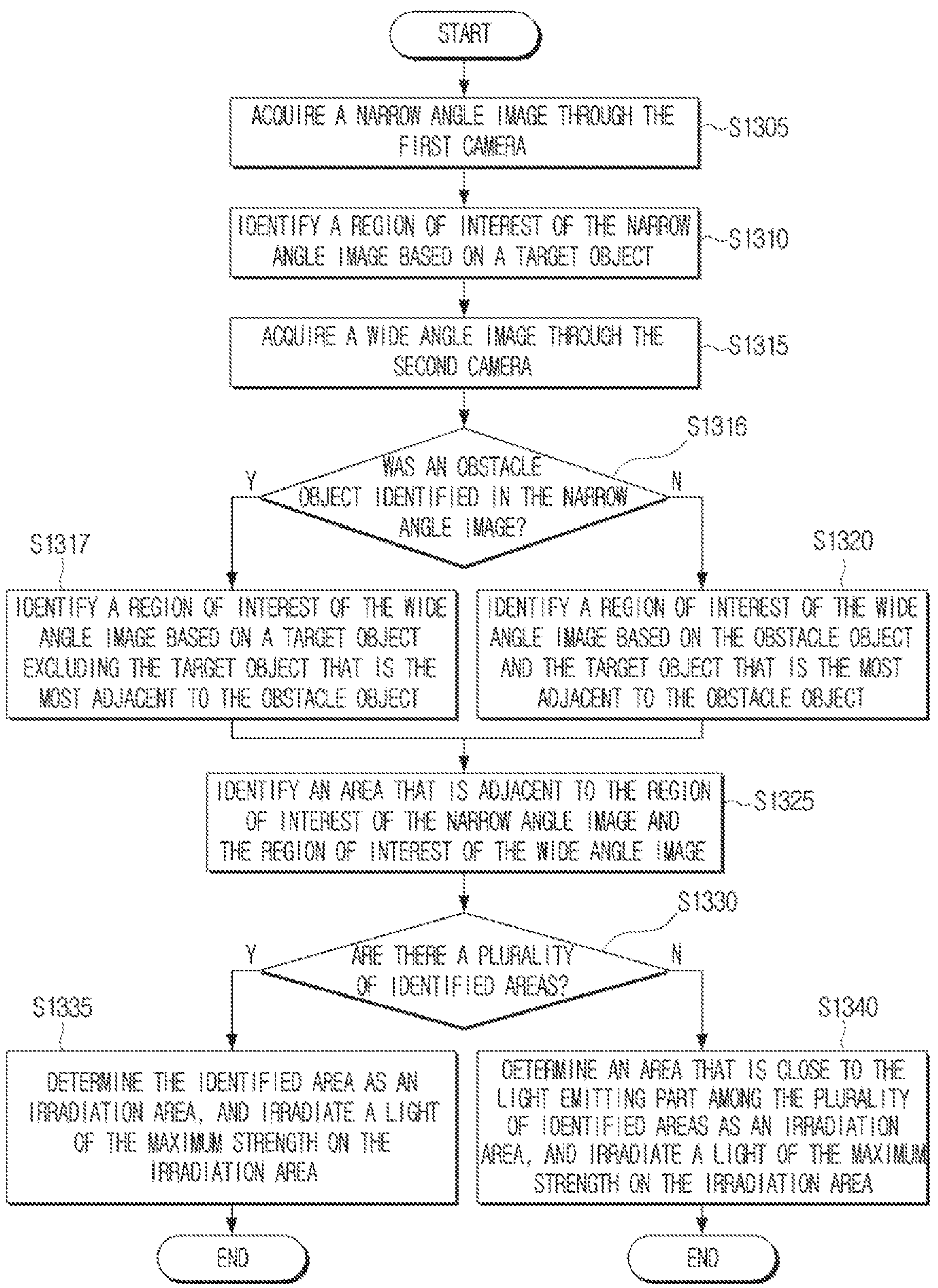
FIG. 13 is a flow chart illustrating an operation of controlling a light emitter based on a region of interest of a narrow angle image and a region of interest of a wide angle image according to an embodiment of the disclosure.

FIG. 13 is a flow chart for illustrating an operation of controlling a light emitter based on a region of interest of a narrow angle image and a region of interest of a wide angle image.

Referring to FIG. 13, the electronic apparatus 100 may acquire a narrow angle image through the first camera 111 in operation S1305.

Meanwhile, the electronic apparatus 100 may identify a region of interest of the narrow angle image based on a target object in operation S1310. Here, the region of interest may mean an area which becomes the subject of analysis according to the intent of the user among the entire areas of the acquired entire image. The narrow angle image may be acquired from the first camera 111, and the first camera 111 may be a narrow angle camera. Accordingly, the region of interest of the narrow angle image may be a region of interest inside the narrow angle image. In case there is a target object on the front side, the region of interest of the narrow angle image may be the area wherein the target object is identified. In case a target object is not identified at all on the front side, the region of interest of the narrow angle image may be a predetermined area. Here, the predetermined area may be the central area of the narrow angle image.

The electronic apparatus 100 may acquire a wide angle image through the second camera 112 in operation S1315.

Then, the electronic apparatus 100 may identify whether an obstacle object is identified in the narrow angle image in operation S1316. If an obstacle object is identified in the narrow angle image, the electronic apparatus 100 may identify a region of interest of the wide angle image based on a target object excluding the target object that is the most adjacent to the obstacle object in operation S1317. The target object that is the most adjacent to the obstacle object may mean the target object covered by the obstacle object. Also, for purposes of this disclosure, the expression "the target object that is the most adjacent to the obstacle object" may be replaced by "the target object which is within a threshold distance from the obstacle object." Detailed explanation in this regard will be described later in connection with FIG. 16 and FIG. 17.

If an obstacle object is not identified in the wide angle image, the electronic apparatus 100 may identify the region of interest of the wide angle image based on the obstacle object and the target object that is the most adjacent to the obstacle object in operation S1320. Here, the electronic apparatus 100 may identify the obstacle object in the wide angle image. The obstacle object may be identified in different locations in the wide angle image according to the time point of photographing and the photographic location, even though the same object is captured. Accordingly, the regions of interest of each of the wide angle images may be different according to the time point of photographing and the photographic location. Also, where an obstacle object is not identified in the operation S1320, the electronic apparatus 100 may identify a region of interest based on a target object that was not identified in the narrow angle image. That is, the target object used in the operation S1320 and the target object used in the operation S1310 may be different. Detailed explanation in this regard will be described later in FIG. 14, FIG. 15, FIG. 18, and FIG. 19.

The electronic apparatus 100 may identify an area that is adjacent to both of the region of interest of the narrow angle image and the region of interest of the wide angle image in operation S1325. Here, the adjacent area may be of a threshold size.

The electronic apparatus 100 may determine whether there are a plurality of areas identified in the operation S1325 in operation S1330. If there are not a plurality of identified areas, the electronic apparatus 100 may determine the identified one area as an irradiation area, and irradiate a light of the maximum strength on the determined irradiation area in operation S1335. Here, the irradiation area may be an area on which a light is irradiated. Detailed explanation in this regard will be described later in FIG. 14, FIG. 15, FIG. 18, and FIG. 19.

If there are a plurality of identified areas, the electronic apparatus 100 may determine the area which is the closest to the light emitter 130 among the plurality of identified areas as the irradiation area, and irradiate a light of the maximum strength on the determined irradiation area in operation S1340. Detailed explanation in this regard will be described later in FIG. 16 and FIG. 17.

Depending on implementation examples, the electronic apparatus 100 may identify points which are the closest to the region of interest of the narrow angle image and the region of interest of the wide angle image, and acquire a central value of the identified points. Then, the electronic apparatus 100 may determine an irradiation point based on the acquired central value. The electronic apparatus 100 may control the light emitter 130 such that a light of the maximum strength is irradiated on the determined irradiation point.

According to an embodiment, the operations in FIG. 13 may be operations of determining an irradiation area in real time.

However, according to another embodiment, the electronic apparatus 100 may determine an irradiation area based on a plurality of stored images after all the capturing operations were already completed once. Here, the determined irradiation area may be used in the next capturing operation. The electronic apparatus 100 may analyze the plurality of stored images, and determined where the most appropriate irradiation area is. For the method of determining an irradiation area according to another embodiment, the electronic apparatus 100 may perform an operation of "identifying at least one narrow angle image including a target object among the plurality of narrow angle images" instead of the operation S1305. Specifically, the electronic apparatus 100 may analyze the plurality of narrow angle images and identify images wherein at least a portion of the target object is identified. Here, in the identified narrow angle images, the entire areas of the target object may be included, or only some areas of the target object may be included.

Also, for the method of determining an irradiation area according to another embodiment, the electronic apparatus 100 may perform an operation of "identifying a wide angle image wherein the target object can be identified without being overlapped by the obstacle object among the plurality of wide angle images" instead of the operation S1315. Here, as the wide angle image is an image in a wide angle, it may include a plurality of target objects. Some target objects may not be overlapped with the obstacle at all, and one target object may be partially overlapped with the obstacle. The target objects that are not overlapped with the obstacle at all can be analyzed from the narrow angle image acquired from the first camera 111. Accordingly, "a wide angle image wherein the target object can be identified without being overlapped by the obstacle object" may mean a wide angle image wherein the target object can be identified, which is located in an adjacent distance from the obstacle object.

Figure 14:
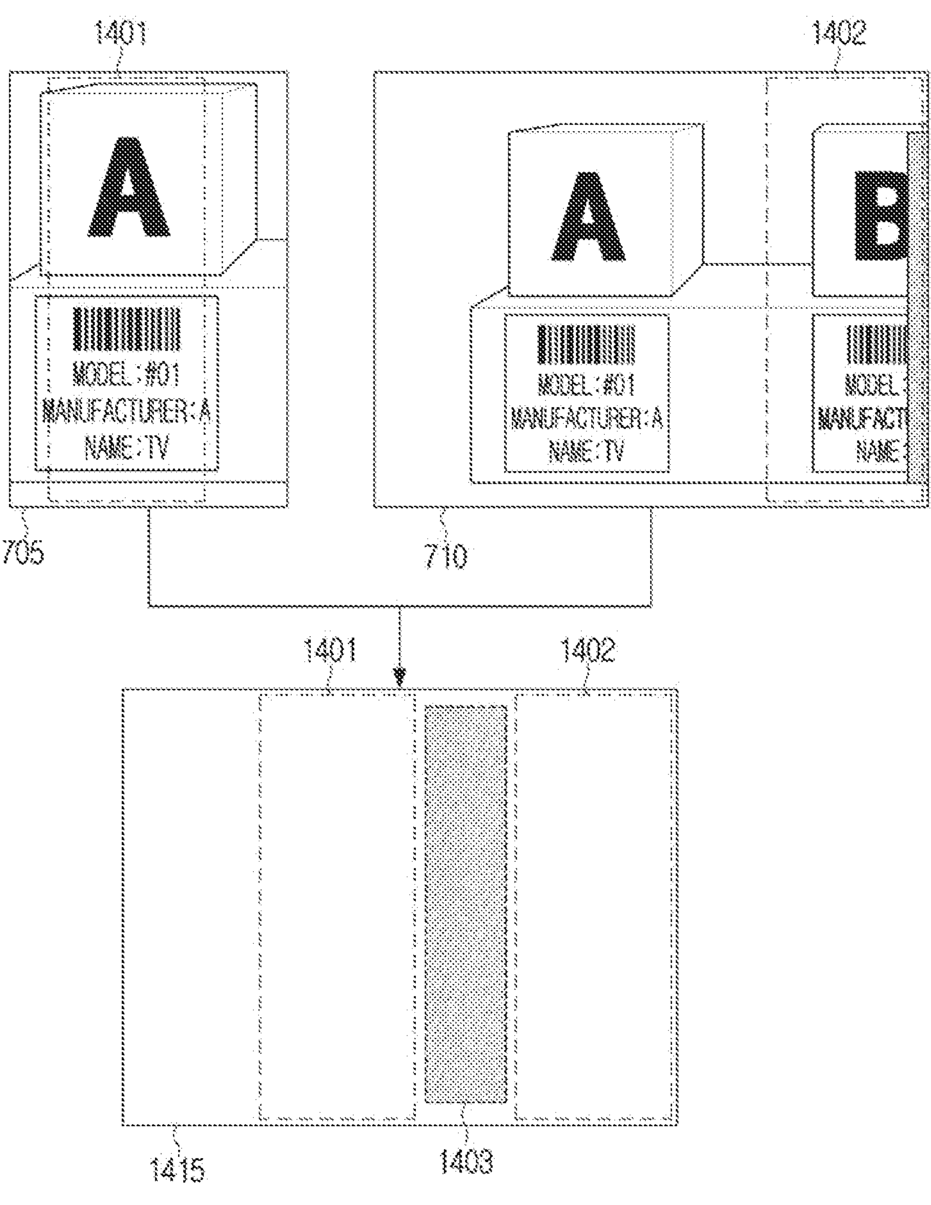
FIG. 14 is a diagram illustrating an operation of identifying an irradiation area in a first image capturing location according to an embodiment of the disclosure.

FIG. 14 is a diagram for illustrating an operation of identifying an irradiation area in a first image capturing location.

Referring to FIG. 14, the electronic apparatus 100 may capture the front side in the first image capturing location 701, and acquire a narrow angle image 705 through the first camera 111, and acquire a wide angle image 710 through the second camera 112.

The electronic apparatus 100 may identify a region of interest 1401 of the narrow angle image 705 based on target objects. For example, the region of interest 1401 of the narrow angle image 705 may be the area wherein the A label 501 and the A product 511 which are the target objects are identified.

Also, the electronic apparatus 100 may determine whether an obstacle object is identified in the narrow angle image 705. If an obstacle object is not identified in the narrow angle image 705, the electronic apparatus 100 may identify a region of interest 1402 of the wide angle image 710 based on an obstacle object and a target object (a target object that is the most adjacent to the target object). Here, the electronic apparatus 100 may set the area including both of the obstacle object and the target object in the wide angle image 710 as the region of interest 1402 of the wide angle image 710. Here, the target object used for identifying the region of interest 1402 of the wide angle image 710 may be different from the target object used for identifying the region of interest 1401 of the narrow angle image 705. For example, the electronic apparatus 100 may identify at least a portion of the obstacle object 520 in the wide angle image 710. Then, the electronic apparatus 100 may identify the B label 502 and the B product 512 which are the most adjacent target objects to the obstacle object 520 among the plurality of target objects included in the wide angle image 710. Then, the electronic apparatus 100 may identify the area wherein all of the obstacle object 520, the B label 502, and the B product 512 are included as the region of interest 1402 of the wide angle image 710.

The electronic apparatus 100 may identify an area 1403 that is adjacent to the region of interest 1401 and the region of interest 1402 based on the identified region of interest 1401 of the narrow angle image 705 and the identified region of interest 1402 of the wide angle image 710. Here, the electronic apparatus 100 may determine the region of interest 1401 and the region of interest 1402 in the image capturing range 1415 of the electronic apparatus 100. Here, in the narrow angle image 705 and the wide angle image 710, the ratios of displaying objects may be different. Accordingly, the electronic apparatus 100 may correct at least one image such that each image displays objects in the same ratios. The electronic apparatus 100 may identify the area 1403 that is adjacent to the region of interest 1401 and the region of interest 1402 in the image capturing range 1415. Here, the adjacent area 1403 may be expressed as one of an irradiation area, a non-interference area, or a non-overlapping area. Hereinafter, the adjacent area will be described as the irradiation area, for the convenience of explanation. Meanwhile, the reason for determining the irradiation area separately is for resolving reduction of the object recognition rate due to reflection of light. In case the strongest light is irradiated on the part of the target object, the recognition rate of the target object may be reduced due to reflection of the light, and thus the light of the biggest strength may be irradiated on an area wherein the target object is not identified.

Figure 15:
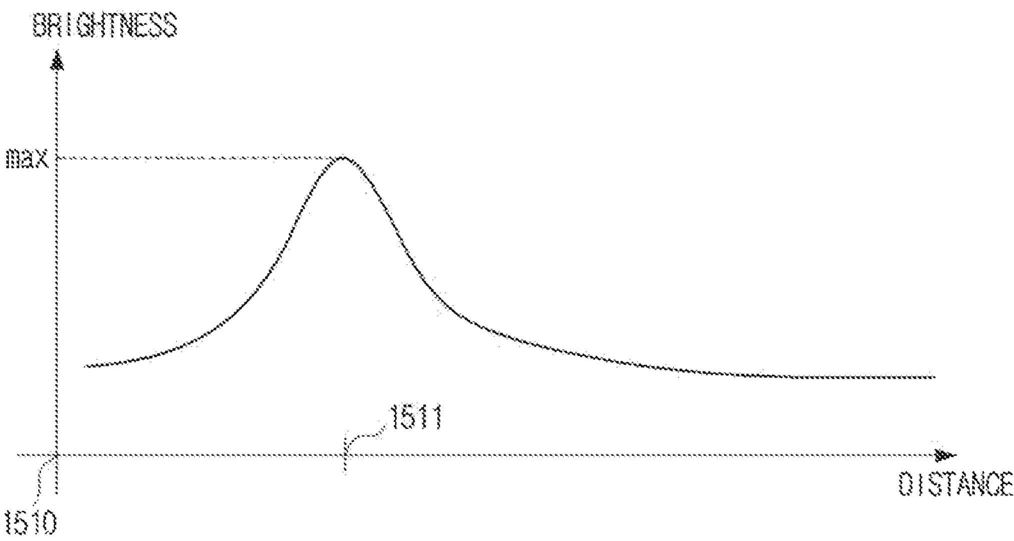
FIG. 15 is a diagram illustrating an operation of controlling a light emitter in a first image capturing location according to an embodiment of the disclosure.
Figure 15:
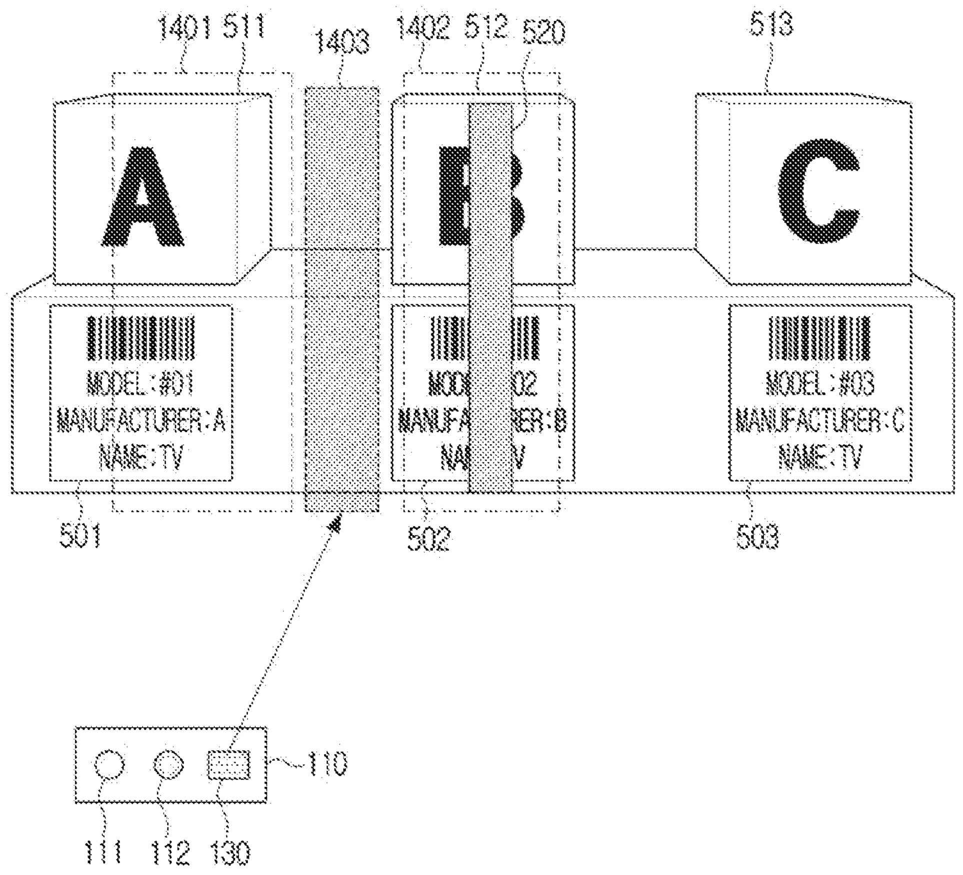

FIG. 15 is a diagram for illustrating an operation of controlling a light emitter in a first image capturing location.

Referring to FIG. 15, the electronic apparatus 100 may determine an irradiation area 1403 located between the region of interest 1401 of the narrow angle image 705 and the region of interest 1402 of the wide angle image 710. Then, the electronic apparatus 100 may control the light emitter 130 such that the brightest light is irradiated on the location corresponding to the irradiation area 1403 based on the determined irradiation area 1403.

Referring to the graph 1510, when the electronic apparatus 100 is in the first image capturing location 701, the brightest light may be irradiated on the location 1511 corresponding to the irradiation area 1403. Meanwhile, light may be irradiated such that light is not irradiated only on the location corresponding to the irradiation area 1403, but the brightest light is irradiated on the location corresponding to the irradiation area 1403.

Figure 16:
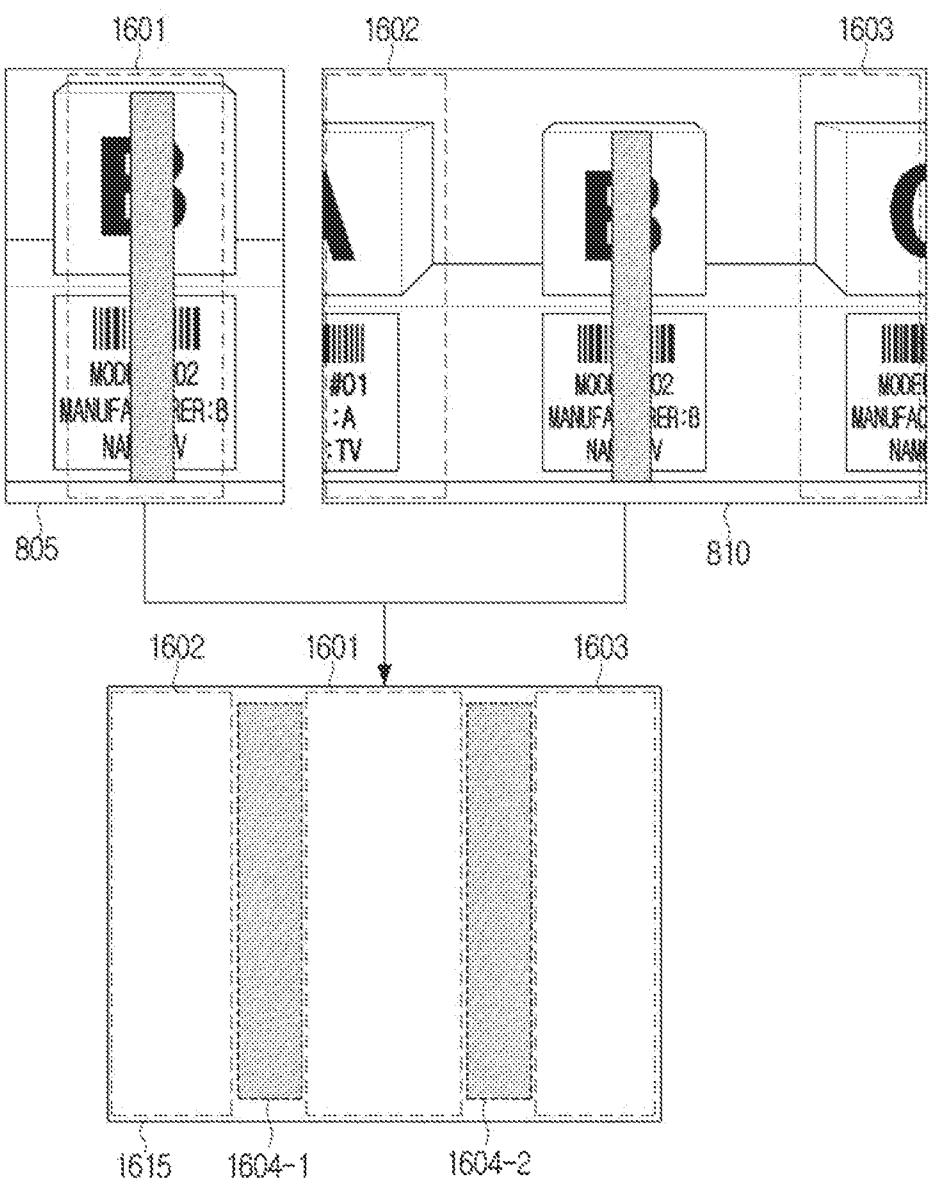
FIG. 16 is a diagram illustrating an operation of identifying an irradiation area in a second image capturing location according to an embodiment of the disclosure.

FIG. 16 is a diagram for illustrating an operation of identifying an irradiation area in a second image capturing location.

Referring to FIG. 16, the electronic apparatus 100 may capture the front side in the second image capturing location 801, and acquire a narrow angle image 805 through the first camera 111, and acquire a wide angle image 810 through the second camera 112.

The electronic apparatus 100 may identify a region of interest 1601 of the narrow angle image 805 based on target objects. For example, the region of interest 1601 of the narrow angle image 805 may be the area wherein the B label 502 and the B product 512 which are the target objects are identified.

Also, the electronic apparatus 100 may determine whether an obstacle object is identified in the narrow angle image 805. If an obstacle object is identified in the narrow angle image 805, the electronic apparatus 100 may identify regions of interest 1602, 1603 of the wide angle image 810 based on the obstacle object and target objects excluding the target objects that are the most adjacent to the obstacle object. Here, the target objects that are the most adjacent to the obstacle object may be the B label 502 and the B product 512, and the target objects excluding the target objects that are the most adjacent to the obstacle object may be the A label 501, the A product 511, the C label 503, and the C product 513. Here, the electronic apparatus 100 may identify the area including the A label 501 and the A product 511 as the region of interest 1602 of the wide angle image 810, and identify the area including the C label 503 and the C product 513 as the region of interest 1603 of the wide angle image 810.

Here, the target objects used for identifying the regions of interest 1602, 1603 of the wide angle image 810 may be different from the target objects used for identifying the region of interest 1601 of the narrow angle image 805.

The electronic apparatus 100 may identify areas 1604-1, 1604-2 adjacent to the region of interest 1601 and the regions of interest 1602, 1603 based on the identified region of interest 1601 of the narrow angle image 805 and the identified regions of interest 1602, 1603 of the wide angle image 810. Specifically, the electronic apparatus 100 may identify the area 1604-1 that is adjacent to the region of interest 1601 of the narrow angle image 805 and the region of interest 1602 of the wide angle image 810, and identify the area 1604-2 that is adjacent to the region of interest 1601 of the narrow angle image 805 and the region of interest 1603 of the wide angle image 810.

Here, the electronic apparatus 100 may determine the region of interest 1601 of the narrow angle image 805 and the regions of interest 1602, 1603 of the wide angle image 810 in the image capturing range 1615 of the electronic apparatus 100. Here, in the narrow angle image 805 and the wide angle image 810, the ratios of displaying objects may be different. Accordingly, the electronic apparatus 100 may correct at least one image such that each image displays objects in the same ratios. The electronic apparatus 100 may identify the areas 1604-1, 1604-2 that are adjacent to the region of interest 1601 and the regions of interest 1602, 1603 in the image capturing range 1615. Here, the adjacent areas 1604-1, 1604-2 may be expressed as one of an irradiation area, a non-interference area, or a non-overlapping area. Hereinafter, the adjacent area will be described as the irradiation area, for the convenience of explanation.

Figure 17:
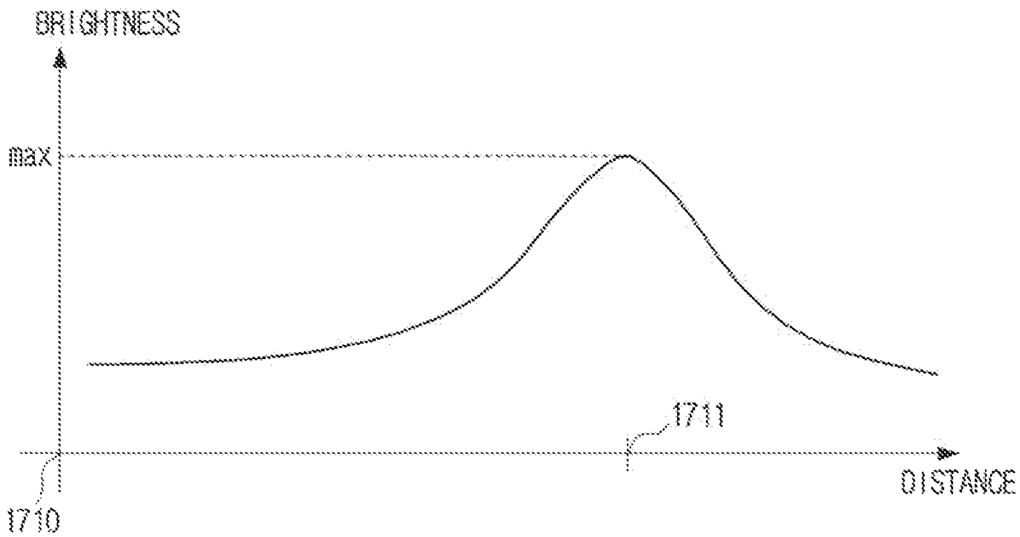
FIG. 17 is a diagram illustrating an operation of controlling a light emitter in a second image capturing location according to an embodiment of the disclosure.
Figure 17:
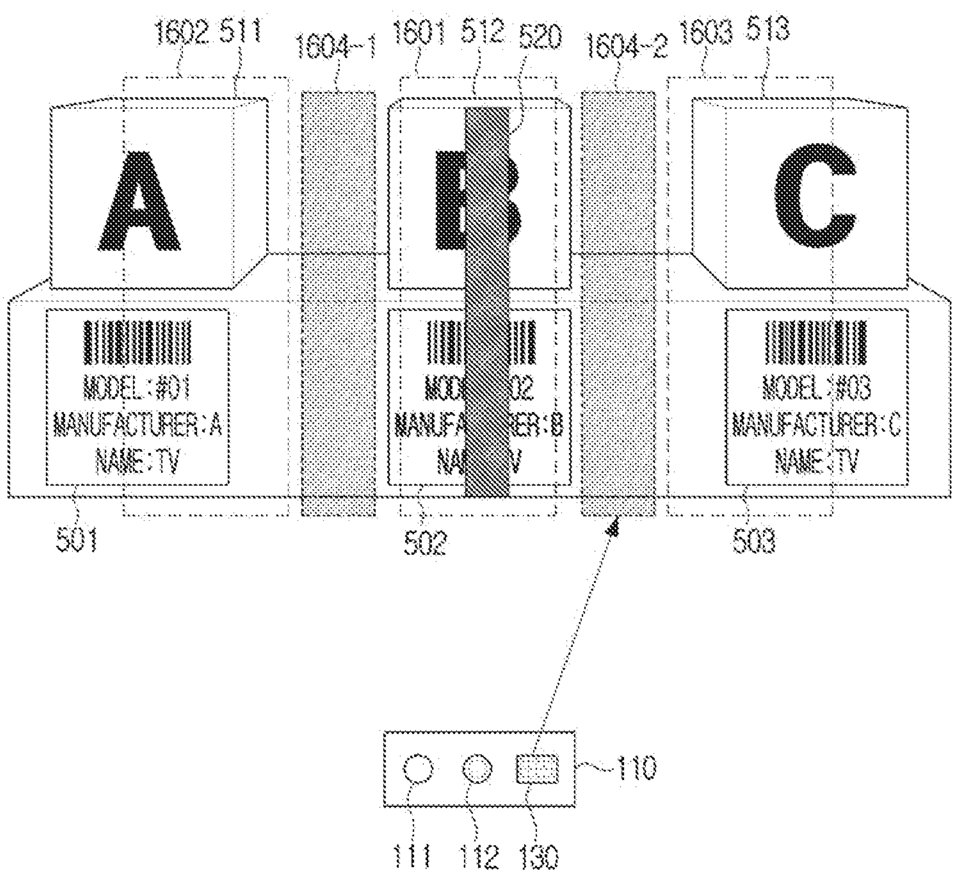

FIG. 17 is a diagram for illustrating an operation of controlling a light emitter in a second image capturing location.

Referring to FIG. 17, an irradiation area 1604-1 located between the region of interest 1601 of the narrow angle image 805 and the region of interest 1602 of the wide angle image 810, and an irradiation area 1604-2 located between the region of interest 1601 of the narrow angle image 805 and the region of interest 1603 of the wide angle image 810 may be determined. Then, when a plurality of irradiation areas are identified, one irradiation area among them may be determined. The electronic apparatus 100 may determine an irradiation area that is close to the location of the light emitter 130 among the plurality of irradiation areas, and control the light emitter 130 to irradiate the brightest light on a location corresponding to the determined irradiation area. Specific operations in this regard were described above in the operations S1330 and S1340 in FIG. 13. The irradiation area that is close to the light emitter 130 between the two irradiation areas 1604-1, 1604-2 based on the second image capturing location 801 may be the 1604-2 area.

Referring to the graph 1710, when the electronic apparatus 100 is in the second image capturing location 801, the brightest light may be irradiated on the location 1711 corresponding to the irradiation area 1604-2.

Figure 18:
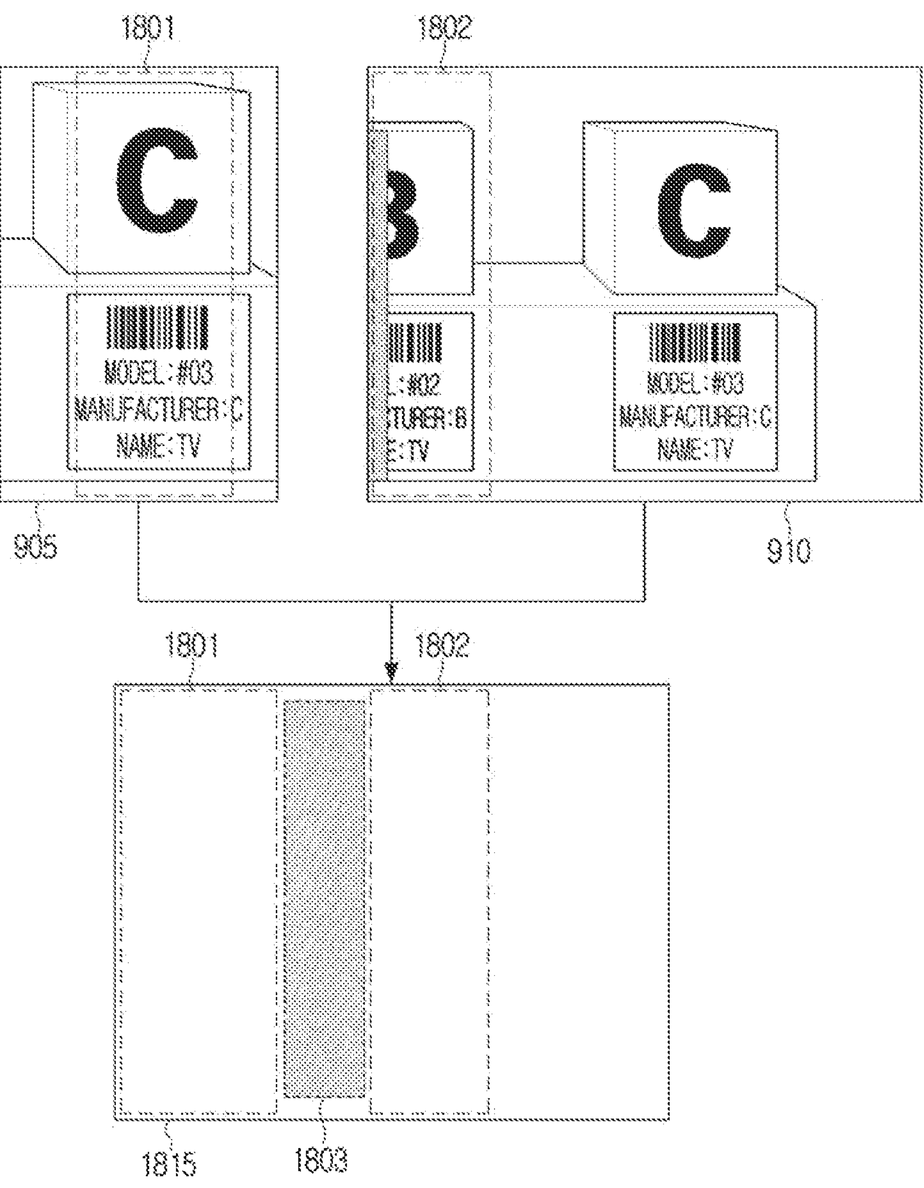
FIG. 18 is a diagram illustrating an operation of identifying an irradiation area in a third image capturing location according to an embodiment of the disclosure.

FIG. 18 is a diagram for illustrating an operation of identifying an irradiation area in a third image capturing location.

Referring to FIG. 18, the electronic apparatus 100 may capture the front side in the third image capturing location 901, and acquire a narrow angle image 905 through the first camera 111, and acquire a wide angle image 910 through the second camera 112.

The electronic apparatus 100 may identify a region of interest 1801 of the narrow angle image 905 based on target objects. For example, the region of interest 1801 of the narrow angle image 905 may be the area wherein the C label 503 and the C product 513 which are the target objects are identified.

Also, the electronic apparatus 100 may determine whether an obstacle object is identified in the narrow angle image 905. If an obstacle object is not identified in the narrow angle image 905, the electronic apparatus 100 may identify a region of interest 1802 of the wide angle image 910 based on an obstacle object and a target object (a target object that is the most adjacent to the obstacle object). Here, the electronic apparatus 100 may set the area including both of the obstacle object and the target object in the wide angle image 910 as the region of interest 1802 of the wide angle image 910. Here, the target objects used for identifying the region of interest 1802 of the wide angle image 910 may be different from the target objects used for identifying the region of interest 1801 of the narrow angle image 905. For example, the electronic apparatus 100 may identify at least a portion of the obstacle object 520 in the wide angle image 910. Then, the electronic apparatus 100 may identify the B label 502 and the B product 512 which are the most adjacent target objects to the obstacle object 520 among the plurality of target objects included in the wide angle image 910. Then, the electronic apparatus 100 may identify the area wherein all of the obstacle object 520, the B label 502, and the B product 512 are included as the region of interest 1802 of the wide angle image 910.

The electronic apparatus 100 may identify an area 1803 that is adjacent to the region of interest 1801 and the region of interest 1802 based on the identified region of interest 1801 of the narrow angle image 905 and the identified region of interest 1802 of the wide angle image 910. Here, the electronic apparatus 100 may determine the region of interest 1801 and the region of interest 1802 in the image capturing range 1815 of the electronic apparatus 100. Here, in the narrow angle image 905 and the wide angle image 910, the ratios of displaying objects may be different. Accordingly, the electronic apparatus 100 may correct at least one image such that each image displays objects in the same ratios. The electronic apparatus 100 may identify the area 1803 that is adjacent to the region of interest 1801 and the region of interest 1802 in the image capturing range 1815. Here, the adjacent area 1803 may be expressed as one of an irradiation area, a non-interference area, or a non-overlapping area. Hereinafter, the adjacent area will be described as the irradiation area, for the convenience of explanation. Meanwhile, the reason for determining the irradiation area separately is for resolving reduction of the object recognition rate due to reflection of light. In case the strongest light is irradiated on the part of the target object, the recognition rate of the target object may be reduced due to reflection of the light, and thus the light of the biggest strength may be irradiated on an area wherein the target object is not identified.

Figure 19:
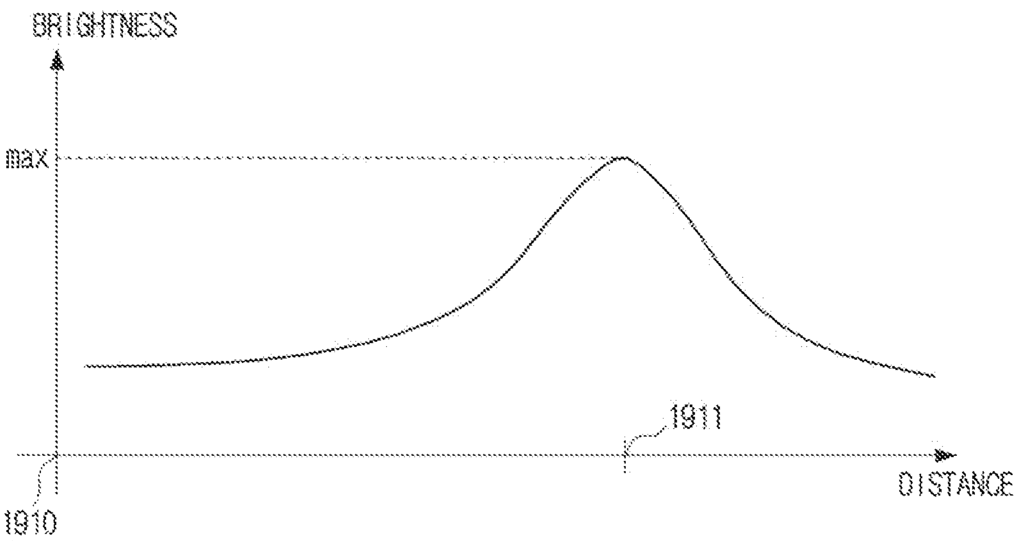
FIG. 19 is a diagram illustrating an operation of controlling a light emitter in a third image capturing location according to an embodiment of the disclosure.
Figure 19:
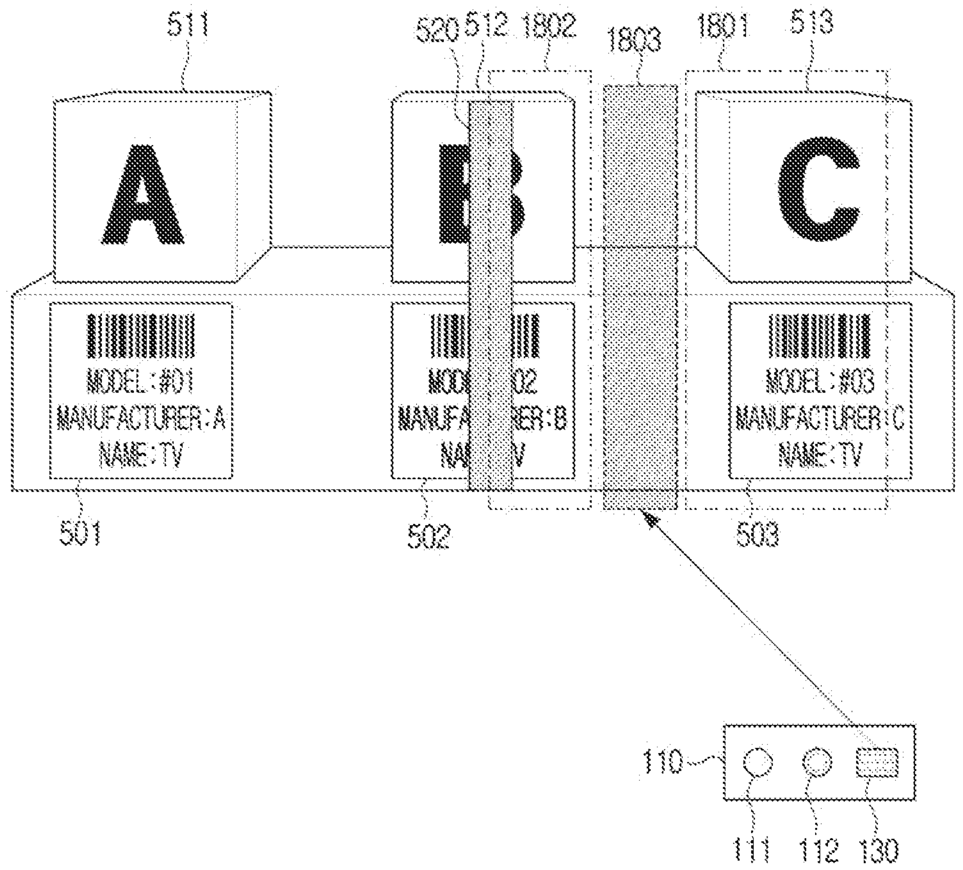

FIG. 19 is a diagram for illustrating an operation of controlling a light emitter in a third image capturing location.

Referring to FIG. 19, the electronic apparatus 100 may determine an irradiation area 1803 located between the region of interest 1801 of the narrow angle image 905 and the region of interest 1802 of the wide angle image 910. Then, the electronic apparatus 100 may control the light emitter 130 such that the brightest light is irradiated on the location corresponding to the irradiation area 1803 based on the determined irradiation area 1803.

Referring to the graph 1910, when the electronic apparatus 100 is in the third image capturing location 901, the brightest light may be irradiated on the location 1911 corresponding to the irradiation area 1803. Meanwhile, light may be irradiated such that light is not irradiated only on the location corresponding to the irradiation area 1803, but the brightest light is irradiated on the location corresponding to the irradiation area 1803.

Figure 20:
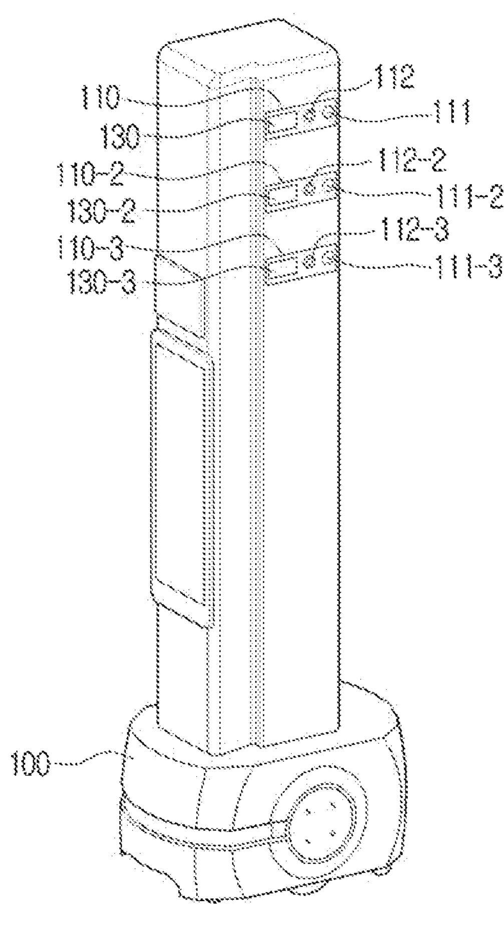
FIG. 20 is a diagram illustrating an electronic apparatus including a plurality of camera modules according to an embodiment of the disclosure.

FIG. 20 is a diagram for illustrating an electronic apparatus including a plurality of camera modules.

Referring to FIG. 20, the electronic apparatus 100 may include a plurality of camera modules. The first camera module 110 may include a first camera 111, a second camera 112, and a light emitter 130. Also, the second camera module 110-2 may include a third camera 111-2 having the same image capturing angle as the first camera 111, a fourth camera 112-2 having the same image capturing angle as the second camera 112, and a light emitter 130-2. Further, the third camera module 110-3 may include a fifth camera 111-3 having the same image capturing angle as the first camera 111, a sixth camera 112-3 having the same image capturing angle as the second camera 112, and a light emitter 130-3.

Each camera module may include a camera including a narrow angle lens, a camera including a wide angle lens, and a light emitter. Also, each camera module may be arranged in a perpendicular direction from the electronic apparatus 100.

Figure 21:
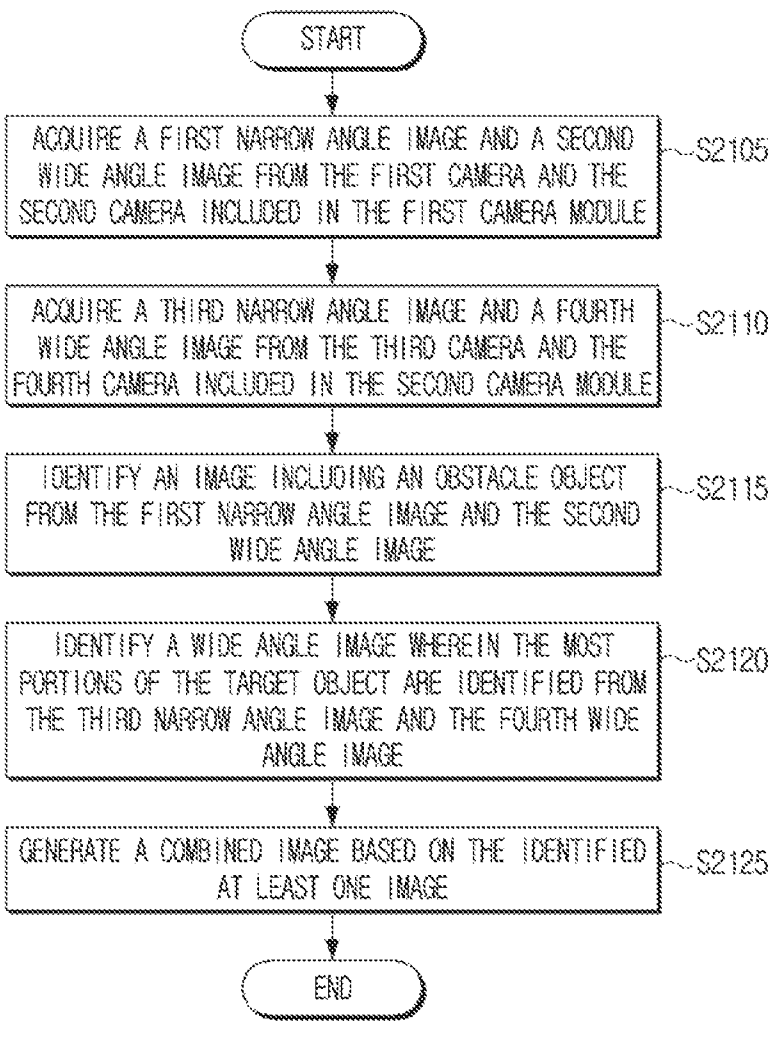
FIG. 21 is a flow chart illustrating an operation of generating a combined image based on images acquired by a plurality of camera modules according to an embodiment of the disclosure.

FIG. 21 is a flow chart for illustrating an operation of generating a combined image based on images acquired by a plurality of camera modules.

Referring to FIG. 21, the electronic apparatus 100 may acquire a first narrow angle image and a second wide angle image from the first camera 111 and the second camera 112 included in the first camera module 110 in operation S2105. Then, the electronic apparatus 100 may acquire a third narrow angle image and a fourth wide angle image from the third camera 111-2 and the fourth camera 112-2 included in the second camera module 110-2. Here, the first narrow angle image may be the narrow angle image acquired from the first camera 111, and the third narrow angle image may be the narrow angle image acquired from the third camera 111-2. Also, the second wide angle image may be the wide angle image acquired from the second camera 112, and the fourth wide angle image may be the wide angle image acquired from the fourth camera 112-2.

The electronic apparatus 100 may identify an image including an obstacle object from the first narrow angle image or the second wide angle image in operation S2115. Then, the electronic apparatus 100 may identify the second wide angle image wherein the most portions of a target object (existing within a threshold distance from the obstacle object) are identified from the third narrow angle image or the fourth wide angle image in operation S2120. That is, when the obstacle object is identified from the first narrow angle image and the second wide angle image acquired from the first camera module 110, the electronic apparatus 100 may identify the portion covered by the obstacle object by using the third narrow angle image and the fourth wide angle image acquired from the second camera module 110-2 located in a vertical length different from the first camera module 110.

The electronic apparatus 100 may generate a combined image based on the images acquired from the first camera module 110 and the images acquired from the second camera module 110-2 in operation S2125. The specific operation of generating a combined image based on the images acquired by the plurality of camera modules will be described below in FIG. 22.

Figure 22:
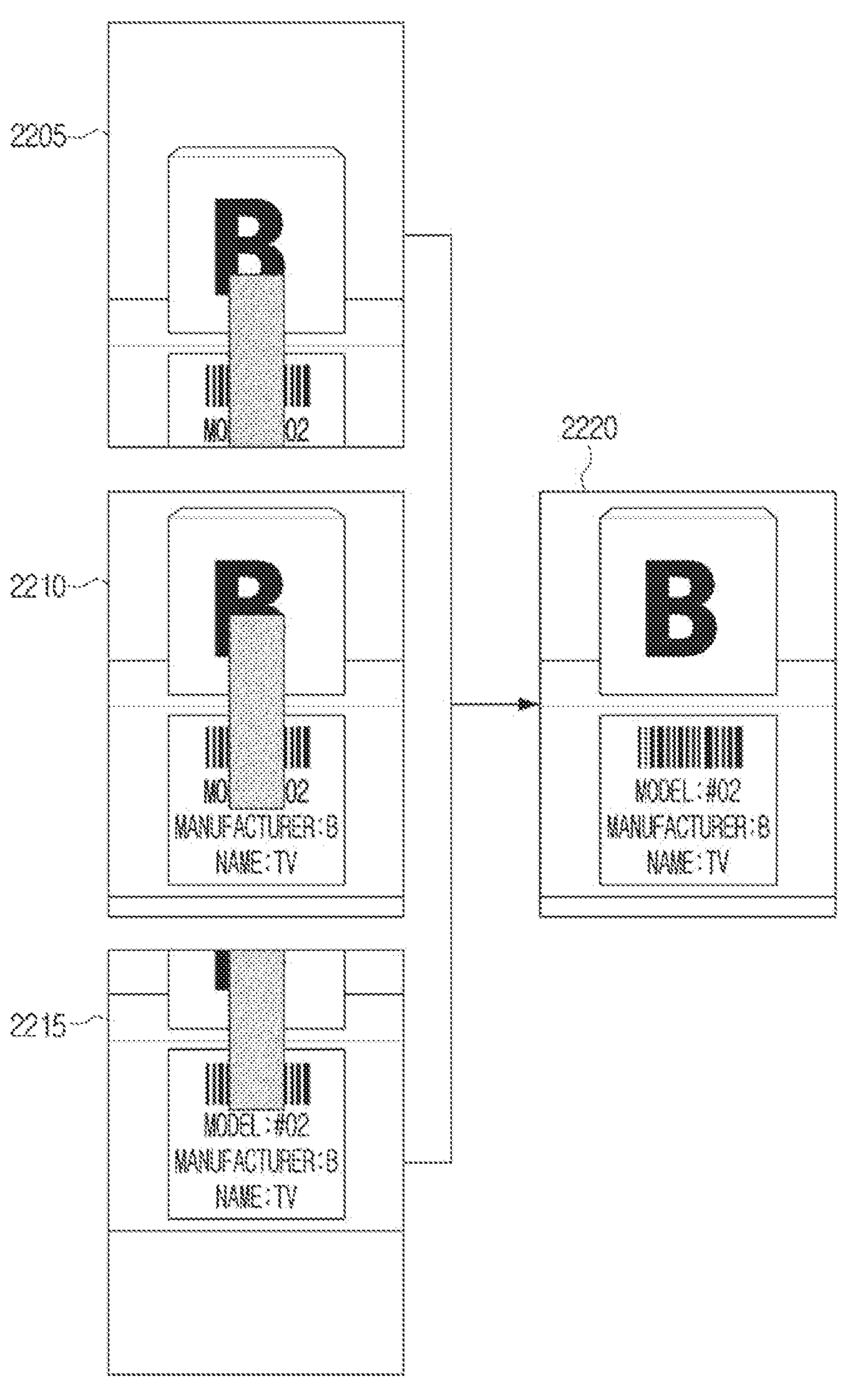
FIG. 22 is a diagram illustrating a combined image that was generated based on images acquired by a plurality of camera modules.

FIG. 22 is a diagram for illustrating a combined image that was generated based on images acquired by a plurality of camera modules.

Referring to FIG. 22, it is assumed that the electronic apparatus 100 includes a plurality of camera modules. Also, as in FIG. 20, it is assumed that the electronic apparatus 100 includes a first camera module 110, a second camera module 110-2, and a third camera module 110-3.

The electronic apparatus 100 may acquire a first narrow angle image 2205 through the first camera 111 included in the first camera module 110, acquire a third narrow angle image 2210 through the third camera 111-2 included in the second camera module 110-2, and acquire a fifth narrow angle image 2215 through the fifth camera 111-3 included in the third camera module 110-3.

The first narrow angle image, the third narrow angle image, and the fifth narrow angle image may include a target object and an obstacle object. Meanwhile, each captured image may have a different image capturing angle. Accordingly, the portions of the target object covered by the obstacle object may be different. That is, a portion that was covered by the obstacle object in one image may not be covered by the obstacle object in another image.

The electronic apparatus 100 may generate a combined image 2220 based on the first narrow angle image 2205, the third narrow angle image 2210, and the fifth narrow angle image 2215. Here, the combined image 2220 may be an image from which the obstacle object was removed.

Figure 23:
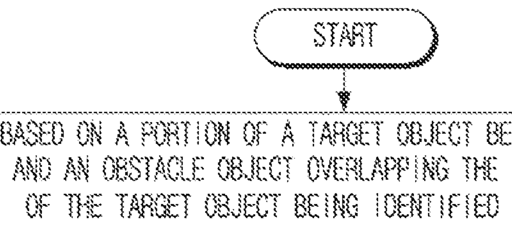
FIG. 23 is a flow chart illustrating a controlling method of an electronic apparatus according to an embodiment of the disclosure.

FIG. 23 is a flow chart for illustrating a controlling method of an electronic apparatus according to an embodiment of the disclosure.

Referring to FIG. 23, the controlling method of the electronic apparatus 100 includes the steps of, based on a portion of a target object being identified and an obstacle object overlapping the other portion of the target object being identified from a first captured image acquired from a first camera having a first image capturing angle or a second captured image acquired from a second camera having a second image capturing angle larger than the first image capturing angle, acquiring location information of the identified obstacle object (S2305), identifying a region of interest of the second captured image based on the acquired location information of the obstacle object (S2310), and identifying the other portion of the target object based on the region of interest of the second captured image (S2315).

The controlling method may further include the steps of acquiring a combined image including the entire image of the target object based on a region including the target object and the obstacle object in the first captured image and the region of interest of the second captured image, and identifying the target object based on the acquired combined image.

The first captured image may be an image captured by the first camera in a first image capturing location, and the second captured image may be an image captured by the second camera in a second image capturing location different from the first image capturing location.

The controlling method may further include the steps of acquiring a third captured image captured from the second camera in a third image capturing location different from the first image capturing location and the second image capturing location, identifying a region of interest of the third captured image based on the identified location information of the obstacle object, and identifying the other portion of the target object based on the region of interest of the second captured image and the region of interest of the third captured image.

The second image capturing location may be located in a first direction based on the first image capturing location, and the third image capturing location may be located in a second direction different from the first direction based on the first image capturing location.

In the step of identifying a region of interest of the second captured image (S2310), a region of interest of the second captured image may be identified based on direction information wherein the second captured image was captured and location information of the obstacle object, and in the step of identifying a region of interest of the third captured image, a region of interest of the third captured image may be identified based on direction information wherein the third captured image was captured and the location information of the obstacle object.

The controlling method may further include the steps of identifying a portion of the target object and the obstacle object based on the first captured image, and identifying the other portion of the target object based on the region of interest of the second captured image.

The controlling method may further include the steps of identifying location information and size information of the obstacle object based on the first captured image, and identifying an image capturing location of the second camera based on the identified location information and size information of the obstacle object, and the second captured image may be an image captured in the identified image capturing location.

The controlling method may further include the steps of identifying the region of interest of the first captured image, identifying a location corresponding to an adjacent area to the region of interest of the first captured image and the region of interest of the second captured image, and irradiating a light greater than or equal to threshold strength on the identified location.

The controlling method may further include the step of changing a light emitting angle such that the light is irradiated on the identified location.

The controlling method of an electronic apparatus as in FIG. 23 may be executed in an electronic apparatus having the configuration as in FIG. 2 or FIG. 3, and may also be executed in electronic apparatuses having other configurations.

The methods according to the various embodiments of the disclosure as described above may be implemented in forms of applications that can be installed on conventional electronic apparatuses.

Also, the methods according to the various embodiments of the disclosure as described above may be implemented just with software upgrade, or hardware upgrade of conventional electronic apparatuses.

Further, the various embodiments of the disclosure as described above may also be performed through an embedded server provided on an electronic apparatus, or an external server of at least one of an electronic apparatus or a display apparatus.

According to an embodiment of the disclosure, the various embodiments as described above may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the embodiments disclosed herein. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the various embodiments of the disclosure as described above may be provided while being included in a computer program product. The computer program product can be traded between a seller and a purchaser as a commodity. The computer program product may be distributed in the form of a machine-readable storage medium (e.g.: a compact disc read only memory (CD-ROM)), or distributed online through an application store (e.g.: PLAY STORE™). In the case of online distribution, at least a portion of the computer program product may be at least temporarily stored in a storage medium such as the server of the manufacturer, the server of the application store, or the memory of the relay server, or temporarily generated.

In addition, each of the components (e.g.: a module or a program) according to the various embodiments as described above may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner. Further, operations performed by a module, a program, or other components according to the various embodiments may be executed sequentially, in parallel, repetitively, or heuristically, or at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
- a first camera having a first angle of view;
- a second camera having a second angle of view greater than the first angle of view;
- memory storing instructions; and
- at least one processor configured to execute the instructions,
- wherein the instructions, when executed by the at least one processor, cause the electronic apparatus to:
  - acquire a first captured image through the first camera,
  - identify a first portion of a target object and an obstacle object overlapping a second portion of the target object in the first captured image,
  - identify location information and size information of the obstacle object based on the first captured image,
  - determine an image capturing location of the second camera based on the identified location information and size information of the obstacle object,
  - control the second camera to acquire a second captured image in the determined image capturing location,
  - identify a region of interest of the second captured image based on the location information of the obstacle object,
  - identify the second portion of the target object based on the region of interest of the second captured image,
  - generate a combined image including an entire image of the target object by combining a region of the first captured image including the target object and the obstacle object with the region of interest of the second captured image, and
  - identify the target object based on the combined image, and
- wherein the region of interest includes a portion of the target object occluded by the obstacle object.

2. The electronic apparatus of claim 1, wherein the first captured image comprises an image captured by the first camera in a first image capturing location, and the second captured image comprises an image captured by the second camera in a second image capturing location different from the first image capturing location.

3. The electronic apparatus of claim 2, wherein the instructions, when executed by the at least one processor, further cause the electronic apparatus to:
- acquire a third captured image through the second camera in a third image capturing location different from the first image capturing location and the second image capturing location,
- identify a region of interest of the third captured image based on the location information of the obstacle object, and
- identify the second portion of the target object based on the region of interest of the second captured image and the region of interest of the third captured image.

4. The electronic apparatus of claim 3,
- wherein the second image capturing location is located in a first direction relative to the first image capturing location, and
- the third image capturing location is located in a second direction different from the first direction relative to the first image capturing location.

5. The electronic apparatus of claim 4, wherein the instructions, when executed by the at least one processor, further cause the electronic apparatus to:
- identify a region of interest of the second captured image based on direction information corresponding to the second image capturing location and the location information of the obstacle object, and
- identify a region of interest of the third captured image based on direction information corresponding to the third image capturing location and the location information of the obstacle object.

6. The electronic apparatus of claim 1, wherein the instructions, when executed by the at least one processor, further cause the electronic apparatus to:
- acquire first information of the target object based on the first portion of the target object, and
- acquire second information of the target object based on the second portion of the target object.

7. The electronic apparatus of claim 1, further comprising:
- a light emitter,
- wherein the instructions, when executed by the at least one processor, further cause the electronic apparatus to:
  - identify a region of interest of the first captured image,
  - identify a location corresponding to an area adjacent to the region of interest of the first captured image and the region of interest of the second captured image, and
  - control the light emitter to irradiate a light greater than or equal to a threshold strength on the identified location.

8. The electronic apparatus of claim 7,
- wherein the instructions, when executed by the at least one processor, further cause the electronic apparatus to change a light emitting angle of the light emitter to cause the light to be irradiated on the identified location.

9. A method of controlling an electronic apparatus, the method comprising:
- acquiring a first captured image through a first camera having a first angle of view;
- identifying a first portion of a target object and an obstacle object overlapping a second portion of the target object in the first captured image;
- identifying location information and size information of the obstacle object based on the first captured image;
- determining an image capturing location of a second camera based on the location information and size information of the obstacle object, wherein the second camera has a second angle of view greater than the first angle of view;

controlling the second camera to acquire a second captured image in the determined image capturing location;

identifying a region of interest of the second captured image based on the location information of the obstacle object;

identifying the second portion of the target object based on the region of interest of the second captured image;

generating a combined image including an entire image of the target object by combining a region of the first captured image including the target object and the obstacle object with the region of interest of the second captured image; and identifying the target object based on the combined image, wherein the region of interest includes a portion of the target object occluded by the obstacle object.

10. The method of claim 9, wherein the first captured image comprises an image captured by the first camera in a first image capturing location, and the second captured image comprises an image captured by the second camera in a second image capturing location different from the first image capturing location.

11. The method of claim 10, further comprising:

acquiring a third captured image captured through the second camera in a third image capturing location different from the first image capturing location and the second image capturing location;

identifying a region of interest of the third captured image based on the identified location information of the identified obstacle object; and identifying the second portion of the target object based on the region of interest of the second captured image and the region of interest of the third captured image.

12. The method of claim 11, wherein the second image capturing location is located in a first direction relative to the first image capturing location, and the third image capturing location is located in a second direction different from the first direction relative to the first image capturing location.

13. An electronic apparatus comprising:

a first camera having a first angle of view;

a second camera having a second angle of view greater than the first angle of view;

memory storing instructions; and at least one processor configured to execute the instructions, wherein the instructions, when executed by the at least one processor, cause the electronic apparatus to:

acquire a first captured image through the first camera, acquire a second captured image through the second camera, and based on identification of a first portion of a target object in either the first captured image or the second captured image and identification of an obstacle object overlapping a second portion of the target object in either the first captured image or the second captured image: acquire location information of the identified obstacle object, identify a region of interest of the second captured image based on the acquired location information of the identified obstacle object, and identify the second portion of the target object based on the region of interest of the second captured image.

* * * * *